United States Patent
Nakagawa et al.

(10) Patent No.: US 10,175,120 B2
(45) Date of Patent: Jan. 8, 2019

(54) INTERNAL TEMPERATURE MEASUREMENT METHOD AND INTERNAL TEMPERATURE MEASUREMENT DEVICE

(71) Applicant: OMRON Corporation, Kyoto-shi, Kyoto (JP)

(72) Inventors: Shinya Nakagawa, Omihachiman (JP); Masao Shimizu, Moriyama (JP); Tsuyoshi Hamaguchi, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 200 days.

(21) Appl. No.: 15/124,374

(22) PCT Filed: Feb. 19, 2015

(86) PCT No.: PCT/JP2015/054549
§ 371 (c)(1),
(2) Date: Sep. 8, 2016

(87) PCT Pub. No.: WO2015/137075
PCT Pub. Date: Sep. 17, 2015

(65) Prior Publication Data
US 2017/0016778 A1 Jan. 19, 2017

(30) Foreign Application Priority Data
Mar. 13, 2014 (JP) .................. 2014-050912

(51) Int. Cl.
*G01K 7/42* (2006.01)
*G01K 7/02* (2006.01)
*G01K 3/14* (2006.01)

(52) U.S. Cl.
CPC ............... *G01K 7/427* (2013.01); *G01K 3/14* (2013.01); *G01K 7/02* (2013.01)

(58) Field of Classification Search
CPC .................. G01K 7/427; G01K 7/02
See application file for complete search history.

(56) References Cited

U.S. PATENT DOCUMENTS

| 2,472,759 A * | 6/1949 | Raspet ..................... G01K 7/02 |
| | | 136/214 |
| 2002/0043104 A1 * | 4/2002 | Lammerink ............ G01F 1/699 |
| | | 73/204.15 |

(Continued)

FOREIGN PATENT DOCUMENTS

| CN | 1457423 A | 11/2003 |
| CN | 2903944 Y | 5/2007 |

(Continued)

OTHER PUBLICATIONS

German Office Action (DEOA) dated Mar. 14, 2018 in a counterpart German patent application.

(Continued)

*Primary Examiner* — Lisa Caputo
*Assistant Examiner* — Philip Cotey
(74) *Attorney, Agent, or Firm* — MetroLexis Law Group, PLLC

(57) ABSTRACT

A method includes measuring a first temperature difference between first heat entry and discharge parts on a first heat transfer path extending from a portion of a surface of the object to the first heat discharge part using a first thermopile, and measuring a second temperature difference between a second heat entry and discharge parts on a second heat transfer path extending from another portion of the surface of the object to the second heat discharge part using a second thermopile, and measuring a reference temperature at a predetermined position on the first or second heat transfer path using a temperature sensor, and calculating the internal temperature of the object using the measured first and second temperature differences, and the reference temperature, and at least one predetermined value excluding a physical property value of a non-heating part of the object located at a surface side of the object.

13 Claims, 19 Drawing Sheets

(56) References Cited

U.S. PATENT DOCUMENTS

| | | | |
|---|---|---|---|
| 2003/0001096 A1* | 1/2003 | Pompei | G01J 5/14 250/349 |
| 2003/0111605 A1 | 6/2003 | Sato et al. | |
| 2004/0227522 A1* | 11/2004 | Male | G01R 31/025 324/524 |
| 2006/0056487 A1 | 3/2006 | Kuroda et al. | |
| 2011/0118705 A1* | 5/2011 | Dekker | G01F 1/6847 604/890.1 |
| 2012/0031106 A1* | 2/2012 | Chillar | F01D 17/085 60/783 |
| 2013/0343423 A1* | 12/2013 | Hosoi | G01K 1/026 374/102 |
| 2014/0153607 A1* | 6/2014 | Chainer | G01K 7/427 374/1 |
| 2014/0190251 A1* | 7/2014 | Huang | G01F 1/6888 73/204.24 |
| 2014/0369386 A1* | 12/2014 | Radhakrishnan | G01K 7/02 374/179 |
| 2017/0276553 A1* | 9/2017 | Nakagawa | G01K 13/002 |
| 2017/0343422 A1* | 11/2017 | Nakagawa | G01K 7/028 |

FOREIGN PATENT DOCUMENTS

| | | |
|---|---|---|
| EP | 2458356 A2 | 5/2012 |
| JP | 2007-212407 A | 8/2007 |
| JP | 2012-098040 A | 5/2012 |
| JP | 2012-098041 A | 5/2012 |
| JP | 2013-210326 A | 10/2013 |

OTHER PUBLICATIONS

Chinese Office Action (CNOA) dated Mar. 23, 2018 in a counterpart Chinese patent application.

* cited by examiner

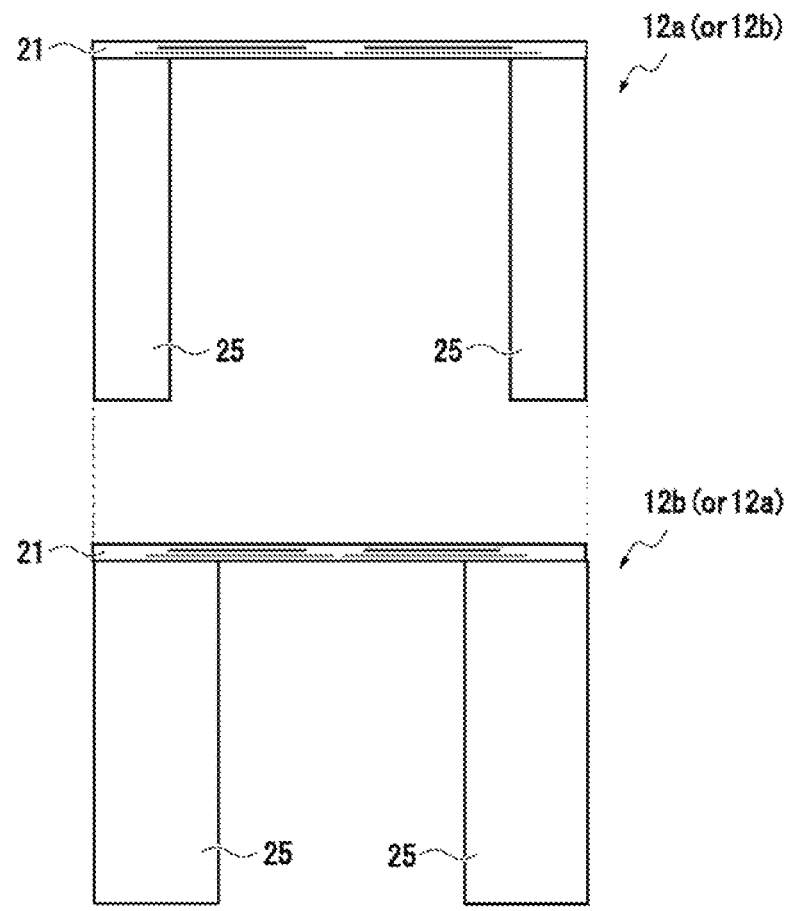

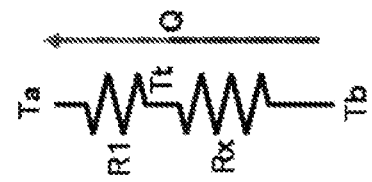
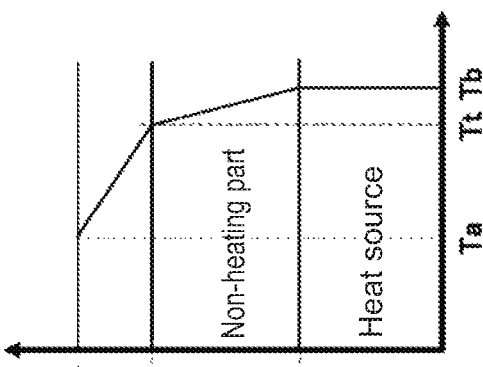
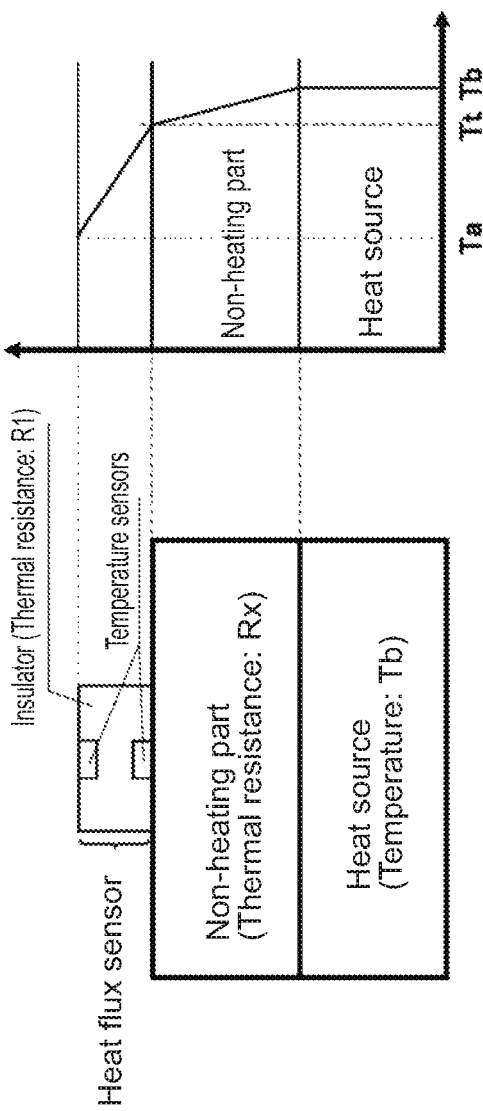

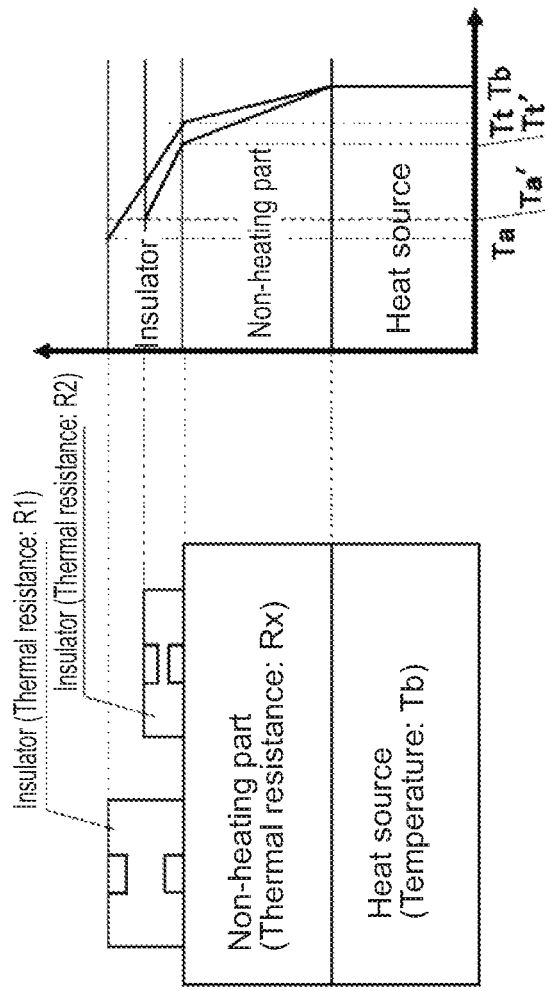

INTERNAL TEMPERATURE MEASUREMENT METHOD AND INTERNAL TEMPERATURE MEASUREMENT DEVICE

FIELD

The present invention relates to an internal temperature measurement method and an internal temperature measurement device for measuring the internal temperature of an object.

BACKGROUND

Simple core body thermometers without heating (hereafter referred to as non-heating core body thermometers) are used to measure the temperature of a core part of a body.

Non-heating core body thermometers known in the art may either include one heat flux sensor (temperature difference sensor) with temperature sensors arranged separately on the upper and lower surfaces of a heat insulator having a relatively large area to measure the core body temperature, or include two such heat flux sensors to measure the core body temperature.

A non-heating core body thermometer that includes one heat flux sensor will now be described with reference to FIGS. 25A to 25C.

To measure the core body temperature using a non-heating core body thermometer including one heat flux sensor, the heat flux sensor is placed in tight contact with a body surface as shown in FIG. 25A.

As shown in FIG. 25B, Tt, which is the temperature of the lower surface of the heat insulator measured with a heat flux sensor placed in tight contact with the body surface (a temperature sensor on the lower surface of the heat insulator), is lower than the core body temperature Tb, and Ta, which is the temperature of the upper surface of the heat insulator measured with a heat flux sensor placed in tight contact with the body surface (a temperature sensor on the upper surface of the heat insulator), is lower than the temperature Tt. The heat equivalent circuit for the structure shown in FIG. 25A can be expressed as shown in FIG. 25C. In the figure, Rx is the thermal resistance of subcutaneous tissue, which is a non-heating part, and R1 is the thermal resistance of the heat insulator.

When the temperature of each part of the heat flux sensor placed in tight contact with the body surface is stabilized, the quantity of heat passing through the non-heating part per unit time is equal to the quantity of heat passing through the heat insulator per unit time. More specifically, when the temperature of each part of the heat flux sensor is stabilized, Formula 1 below holds.

$$(Tb-Tt)/Rx=(Tt-Ta)/R1 \quad (1)$$

Thus, when the temperature of each part of the heat flux sensor is stable, the core body temperature Tb can be calculated using Formula 2 below, which is obtained by solving Formula 1 for Tb.

$$Tb=Tt+(Tt-Ta)\cdot Rx/R1 \quad (2)$$

The non-heating core body thermometer that measures the core body temperature using the single heat flux sensor calculates the core body temperature Tb using Formula 2.

The value of Rx varies depending on positions as well as individual persons. When the core body temperature Tb is calculated using a fixed value as the Rx value in Formula 2, the measurement result will include a measurement error in accordance with a difference between the Rx value used in Formula 2 and an actual value of Rx.

The non-heating core body thermometer that measures the core body temperature using two heat flux sensors has been developed to reduce such measurement errors in the measurement result of the core body temperature Tb.

To measure the core body temperature using this type of non-heating core body thermometer, as shown in FIG. 26A, the two heat flux sensors are placed in tight contact with the body surface.

As shown in FIGS. 26A and 26B, Ta is the temperature of the upper surface of the heat insulator measured using the thermal resistance of the heat insulator of one heat flux sensor (first heat flux sensor), and Tt is the temperature of the lower surface of the heat insulator measured using the thermal resistance of the heat insulator of the first heat flux sensor, whereas Ta' is the temperature of the upper surface of the heat insulator measured using the thermal resistance of the heat insulator of the other heat flux sensor (second heat flux sensor), and Tt' is the temperature of the lower surface of the heat insulator measured using the thermal resistance of the heat insulator of the second heat flux sensor. The heat equivalent circuit for the structure shown in FIG. 26A can be expressed as shown in FIG. 26C. In the figure, Rx is the thermal resistance of subcutaneous tissue, which is a non-heating part, R1 is the thermal resistance of the heat insulator in the first heat insulator, and R2 is the thermal resistance of the heat insulator in the second heat insulator.

As a result, Formula 2 described above holds for the first heat flux sensor, whereas Formula 3 below holds for the second heat flux sensor.

$$Tb=Tt'+(Tt'-Ta')\cdot Rx/R2 \quad (3)$$

Eliminating Rx from Formulas 2 and 3 yields Formula 4 below.

Formula 1

$$Tb = \frac{R2(Tt-Ta)Tt' - R1(Tt'-Ta')Tt}{R2(Tt-Ta) - R1(Tt'-Ta')} \quad (4)$$

Formula 4 can be transformed into Formula 5 below using the ratio k of R2 to R1 (=R2/R1).

Formula 2

$$Tb = \frac{k(Tt+Ta)Tt' - (Tt'-Ta')Tt}{k(Tt-Ta) - (Tt'-Ta')} \quad (5)$$

The non-heating core body thermometer that measures the core body temperature using the two heat flux sensors calculates the core body temperature Tb using Formula 4 or 5 above.

CITATION LIST

Patent Literature

Patent Literature 1: Japanese Unexamined Patent Application Publication No. 2007-212407

SUMMARY

Technical Problem

The non-heating core body thermometer that measures the core body temperature using the two heat flux sensors can relatively accurately measure (calculate) the core body temperature Tb, independently of the Rx value of a measurement subject person or a measurement position of the core body temperature Tb. As described above (refer to FIGS. 26A to 26C), the non-heating core body thermometer known in the art obtains information for calculating the core body temperature Tb with the four temperature sensors. The accuracy of the temperature sensors is not very high, and thus the existing non-heating core body thermometer uses a heat insulator with a large thermal resistance and a large thermal capacity. As a result, the existing non-heating core body thermometer has poor responsiveness (takes a long time to obtain a stable measurement result of the core body temperature). Further, the existing non-heating core body thermometer can have a large error in its measurement result of the core body temperature caused by an individual difference between the temperature sensors.

One or more aspects of the present invention are directed to an internal temperature measurement method and an internal temperature measurement device for measuring the internal temperature of an object including a non-heating part at its surface side having an unknown thermal resistance more accurately than existing structures.

Solution to Problem

In response to the above issue, an internal temperature measurement method for measuring an internal temperature of an object according to one aspect of the present invention includes a measuring process and a calculating process. The measuring process includes measuring a first temperature difference between a first heat entry part and a first heat discharge part on a first heat transfer path extending from a portion of a surface of the object to the first heat discharge part using a first thermopile, and measuring a second temperature difference between a second heat entry part and a second heat discharge part on a second heat transfer path extending from another portion of the surface of the object to the second heat discharge part and having a thermal resistance different from a thermal resistance of the first heat transfer path using a second thermopile, and measuring a reference temperature using a temperature sensor. The reference temperature is a temperature at a predetermined position on the first heat transfer path or the second heat transfer path. The calculating process includes calculating the internal temperature of the object using the first temperature difference, the second temperature difference, and the reference temperature measured in the measuring process and at least one predetermined value excluding a physical property value of a non-heating part of the object located at a surface side of the object.

More specifically, the internal temperature measurement method according to the aspect of the present invention uses the measured values for calculating the internal temperature obtained with the two thermopiles and the single temperature sensor. This method using the thermopiles can measure the temperature difference more accurately than when using two temperature sensors. Without using a plurality of temperature sensors, this method also prevents an error (individual difference) between the temperature sensors from accumulating into a large error involved in the measurement result. The internal temperature measurement method according to the aspect of the present invention can thus measure the internal temperature of an object including a non-heating part at its surface side having an unknown thermal resistance more accurately than existing structures.

The internal temperature measurement method according to the aspect of the present invention may use one of various calculating processes. For example, the calculating process may include calculating the internal temperature of the object using a formula for calculating the internal temperature of the object derived assuming that a temperature of the first heat discharge part is equal to a temperature of the second heat discharge part.

Moreover, the measuring process may include measuring a third temperature difference between the first heat entry part and the second heat entry part using a third thermopile. Further, the calculating process may include calculating the internal temperature of the object using the first temperature difference, the second temperature difference, the third temperature difference, and the reference temperature, and the at least one predetermined value.

Moreover, the measuring process includes measuring the first temperature difference and the second temperature difference that are associated with the first heat transfer path and the second heat transfer path in which the first heat discharge part and the second heat discharge part are identical or connected to each other. This measuring process eliminates the need for the assumption that the temperature of the first heat discharge part is equal to the temperature of the second heat discharge part, and allows more accurate measurement (calculation) of the internal temperature of the object.

The at least one predetermined value in the calculating process may include a ratio of a thermal resistance of a portion of the first heat transfer path from the first heat entry part to the first heat discharge part to a thermal resistance of a portion of the second heat transfer path from the second heat entry part to the second heat discharge part or an inverse of the ratio. The ratio of the thermal resistance of the portion of the first heat transfer path from the first heat entry part to the first heat discharge part to the thermal resistance of the portion of the second heat transfer path from the second heat entry part to the second heat discharge part or the inverse of the ratio can be obtained without obtaining the thermal resistance of the portion of the first heat transfer path from the first heat entry part to the first heat discharge part and the thermal resistance of the portion of the second heat transfer path from the second heat entry part to the second heat discharge part. When this value is used as the at least one predetermined value in the calculating process, the parameter used in the calculating process can be easily obtained.

The internal temperature measurement method according to the aspect of the present invention may include calculating a parameter associated with a thermal resistance of the non-heating part to be included in a formula for calculating the internal temperature of the object in a nonequilibrium state based on a measurement result obtained in the measurement process, and calculating the internal temperature of the object in the nonequilibrium state based on the formula for calculating the temperature using the parameter calculated in the parameter calculating process. The internal temperature measurement method according to the aspect of the present invention including the above two processes can calculate the internal temperature of the object in the non-equilibrium state.

In response to the above issue, an internal temperature measurement device according to another aspect of the present invention includes a substrate having a first surface to be placed in contact with a surface of an object to measure an internal temperature of the object, a first temperature difference sensor and a second temperature difference sensor arranged on a second surface of the substrate, a temperature sensor, and a calculation unit that calculates the internal temperature of the object using a temperature difference measured by the first temperature difference sensor, a temperature difference measured by the second temperature difference sensor, a temperature measured by the temperature sensor, and at least one predetermined value excluding a physical property value of a non-heating part of the object located at a surface side of the object. The first temperature difference sensor includes a first thin film including a first heat entry part and a first heat discharge part, and a first thermopile that detects a temperature difference between the first heat entry part and the first heat discharge part included in the first thin film. The first thin film is supported on the substrate with a first thermal conductivity member that transfers heat entering the substrate from the object to the first heat entry part included in the first thin film. The second temperature difference sensor includes a second thin film including a second heat entry part and a second heat discharge part, and a second thermopile that detects a temperature difference between the second heat entry part and the second heat discharge part included in the second thin film. The second thin film is supported on the substrate with a second thermal conductivity member that transfers heat entering the substrate from the object to the second heat entry part included in the second thin film. A thermal resistance of a portion of a heat transfer path extending from a heat entrance of the second thermal conductivity member to the second heat discharge part in the second thin film is different from a thermal resistance of a portion of a heat transfer path extending from a heat entrance of the second thermal conductivity member of the second temperature difference sensor to the second heat discharge part included in the second thin film. The temperature sensor measures a temperature of the second surface of the substrate, a temperature of the first heat entry part of the first temperature difference sensor, or a temperature of the second heat entry part of the second temperature difference sensor.

More specifically, the internal temperature measurement device also uses the measured values for calculating the internal temperature obtained with the two thermopiles and the single temperature sensor. This measurement device using the thermopiles can measure the temperature difference more accurately than when using two temperature sensors. Without using a plurality of temperature sensors, this measurement device also prevents an error (individual difference) between the temperature sensors from accumulating into a large error involved in the measurement result. The internal temperature measurement device according to the aspect of the present invention can thus measure the internal temperature of an object including a non-heating part at its surface side having an unknown thermal resistance more accurately than existing structures.

The internal temperature measurement device according to the aspect of the present invention may include one of various calculation units. For example, the device may include the calculation unit that calculates the internal temperature of the object using a formula for calculating the internal temperature of the object derived assuming that the temperature of the first heat discharge part is equal to the temperature of the second heat discharge part.

The internal temperature measurement device according to the aspect of the present invention may further include a third thin film that connects the first heat entry part of the first temperature difference sensor and the second heat entry part of the second temperature difference sensor. The third thin film includes a third thermopile that measures a temperature difference between the first heat entry part of the first temperature difference sensor and the second heat entry part of the second temperature difference sensor. The calculation unit may calculate the internal temperature of the object using a temperature difference measured by the first temperature difference sensor, a temperature difference measured by the second temperature difference sensor, a temperature difference measured by the third thermopile, and a temperature measured by the temperature sensor, and the at least one predetermined value. This structure eliminates the need for the assumption that the temperature of the first heat discharge part is equal to the temperature of the second heat discharge part. The internal temperature measurement device with this structure allows more accurate measurement (calculation) of the internal temperature of the object.

In the internal temperature measurement device according to the aspect of the present invention, the first heat discharge part of the first temperature difference sensor and the second heat discharge part of the second temperature difference sensor may be identical or connected to each other. This internal temperature measurement device also eliminates the need for the assumption that the temperature of the first heat discharge part is equal to the temperature of the second heat discharge part, and thus allows more accurate measurement (calculation) of the internal temperature of the object.

The internal temperature measurement device according to the aspect of the present invention may further include a connection unit that connects the first heat entry part of the first temperature difference sensor and the second heat entry part of the second temperature difference sensor. In other words, the internal temperature measurement device according to the aspect of the present invention may include a single sensor that functions as the first temperature difference sensor and the second temperature difference sensor. This internal temperature measurement device eases the operation for mounting the sensor onto the substrate. The connection unit may have a poor thermal conductivity (for example, including a large thin film portion).

The calculation unit may use the at least one predetermined value including a ratio of a thermal resistance of a portion of the first heat transfer path from the first heat entry part to the first heat discharge part to a thermal resistance of a portion of the second heat transfer path from the second heat entry part to the second heat discharge part or an inverse of the ratio. The ratio of the thermal resistance of the portion of the first heat transfer path from the first heat entry part to the first heat discharge part to the thermal resistance of the portion of the second heat transfer path from the second heat entry part to the second heat discharge part or the inverse of the ratio can be obtained without obtaining the thermal resistance of the portion of the first heat transfer path from the first heat entry part to the first heat discharge part and the thermal resistance of the portion of the second heat transfer path from the second heat entry part to the second heat discharge part. When this value is used as the at least one predetermined value, information used for designing this calculation unit (programming for example) can be easily obtained.

The calculation unit may further calculate a parameter associated with a thermal resistance of the non-heating part to be included in a formula for calculating the internal temperature of the object in a nonequilibrium state based on a measurement result obtained by each sensor, and calculate the internal temperature of the object in the nonequilibrium state based on the formula for calculating the temperature using the calculated parameter. The internal temperature measurement device including the calculation unit with these two functions can calculate the internal temperature of the object in the nonequilibrium state.

Advantageous Effects

One or more embodiments of the present invention allow more accurate measurement of the internal temperature of an object than existing structures.

BRIEF DESCRIPTION OF THE DRAWINGS

FIG. 3B is a diagram describing two temperature difference sensors with different thermal resistances in their predetermined portions included in the internal temperature measurement device according to the first embodiment.

FIGS. 25A to 25C are diagrams describing an existing non-heating core body thermometer including one heat flux sensor (temperature difference sensor).

FIGS. 26A to 26C are diagrams describing an existing non-heating core body thermometer including two heat flux sensors.

DETAILED DESCRIPTION

First Embodiment

Figure 1:
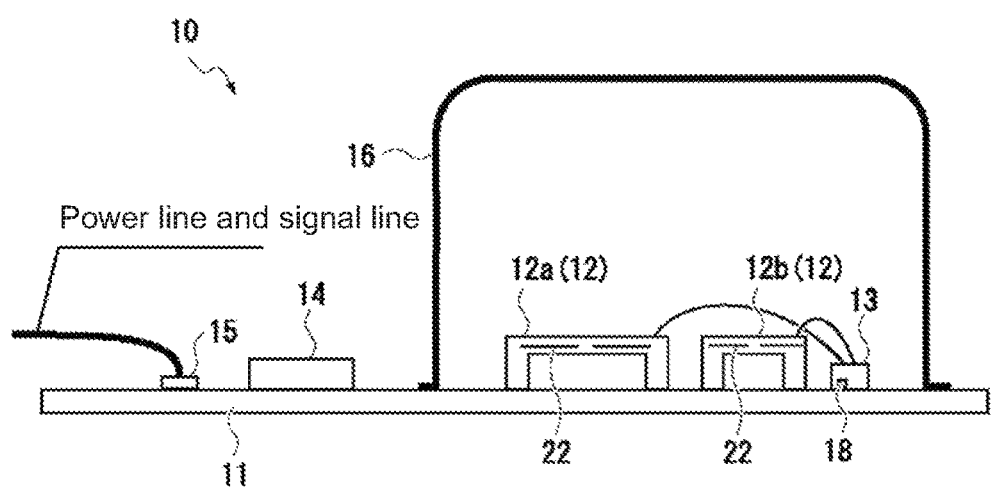
FIG. 1 is a schematic diagram of an internal temperature measurement device according to a first embodiment of the present invention.

FIG. 1 is a schematic diagram of an internal temperature measurement device 10 according to a first embodiment of the present invention.

As shown in FIG. 1, the internal temperature measurement device 10 according to the present embodiment includes a substrate 11, two temperature difference sensors 12 (12a and 12b) mounted on the substrate 11, an application specific integrated circuit (ASIC) 13, an arithmetic circuit 14, and a terminal 15. The internal temperature measurement device 10 further includes a housing 16. The housing 16 accommodating the two temperature difference sensors 12 and the ASIC 13 is mounted on the substrate 11.

The substrate 11 has wiring connecting the ASIC 13, the arithmetic circuit 14, and the terminal 15. When in use, the internal temperature measurement device 10 has its lower surface (lower surface in FIG. 1) of the substrate 11 placed in contact with a surface of an object for which the internal temperature is to be measured.

The terminal 15 allows connection to a power line and a signal line extending from a measuring device used for the internal temperature measurement device 10. The measuring device used for the internal temperature measurement device 10 can obtain a measurement result of the internal temperature from the internal temperature measurement device 10 by communicating with the internal temperature measurement device 10 via a signal line, and display or record the obtained measurement result, or supply power to the internal temperature measurement device 10 via the power line.

Each temperature difference sensor 12 is a miniature (typically with a size of not more than 1 mm square) sensor (heat flux sensor) fabricated using micro electro mechanical systems (MEMS) technology. Although described in detail later, each temperature difference sensor 12 includes a thermopile 22 to detect a temperature difference.

The ASIC 13 is an integrated circuit with a built-in temperature sensor 18. The ASIC 13 amplifies outputs of the temperature difference sensors 12a and 12b and an output of the temperature sensor 18, and digitizes the amplified outputs. The ASIC 13 according to the present embodiment includes a proportional to absolute temperature (PTAT) voltage generator, which outputs a voltage proportional to an absolute temperature (more specifically, a voltage generator that functions as a thermometer). In other words, the ASIC 13 allows the components of the PTAT voltage generator to function as the temperature sensor 18. The ASIC 13 also amplifies an output from each sensor using a chopper amplifier.

The arithmetic circuit 14 calculates the internal temperature of an object based on the measured value of the temperature or the temperature difference input from each sensor via the ASIC 13 and outputs the calculated internal temperature. Although the procedure for calculating the internal temperature by the arithmetic circuit 14 will be described in detail later, the arithmetic circuit 14 may output (transmit) the calculated internal temperature from the terminal 15, or output (store) the calculated internal temperature into its internal memory. The arithmetic circuit 14 may be a single element (e.g., an integrated circuit), or a unit including a plurality of elements. The arithmetic circuit 14 may further be a programmable element or unit, or an unprogrammable element or unit. The arithmetic circuit 14 is typically a programmable element or unit.

The housing 16 is a case that accommodates the temperature difference sensors 12a and 12b and the temperature sensor 18 to provide the stationary surrounding air for the temperature difference sensors 12a and 12b and the temperature sensor 18 (the ASIC 13) and thus stabilize outputs from each sensor, and also to prevent infrared rays from entering each temperature difference sensor 12 from above.

The housing 16 may be formed from any material that prevents air from flowing into and out of the housing 16 and prevents infrared rays from entering the housing 16. Electromagnetic waves may also change outputs from each sensor. The housing 16 may thus be formed from a material that prevents entry of external electromagnetic waves, such as metal or an electrically conductive non-metallic material. The housing 16 may be a single member or may combine a plurality of members. To improve the stability of the temperature inside the housing 16, the housing 16 may have an infrared absorber (e.g., black resin) arranged on its inner surface.

Figure 2A:
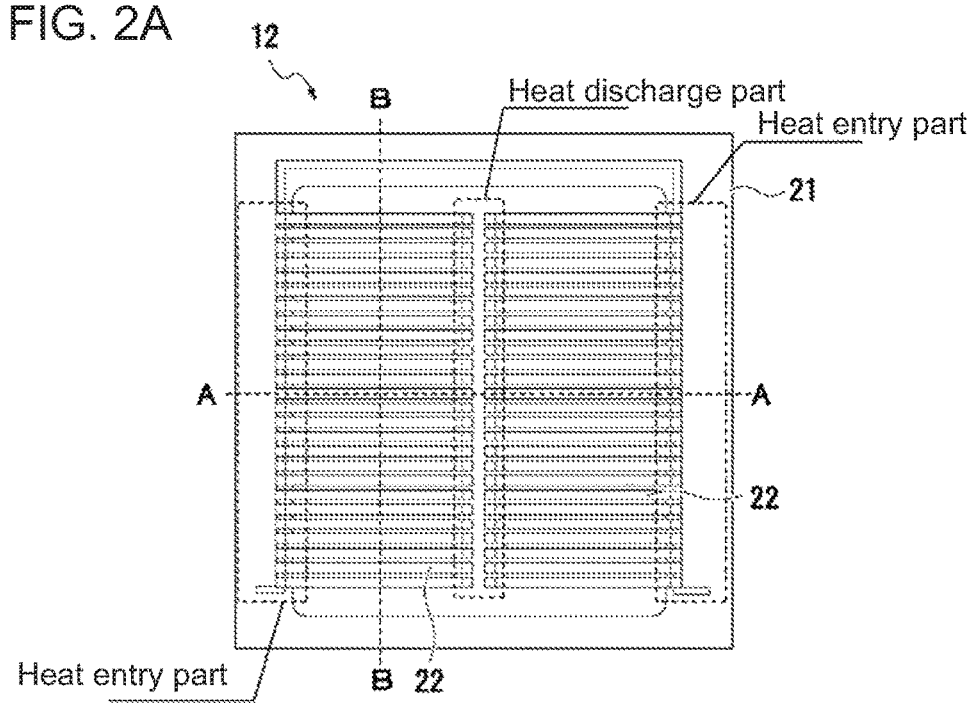
FIG. 2A is a top view of a temperature difference sensor included in the internal temperature measurement device according to the first embodiment.
Figure 2B:
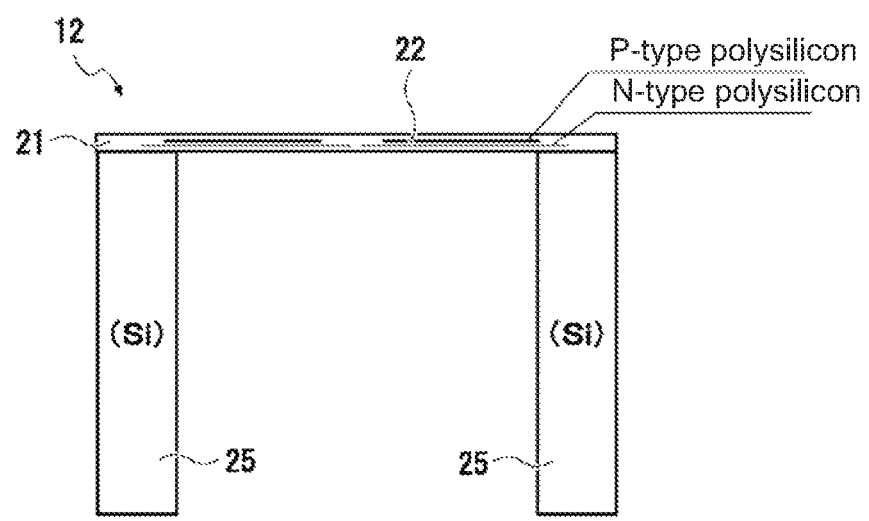
FIG. 2B is a cross-sectional view of the temperature difference sensor taken along line A-A in FIG. 2A.
Figure 2C:
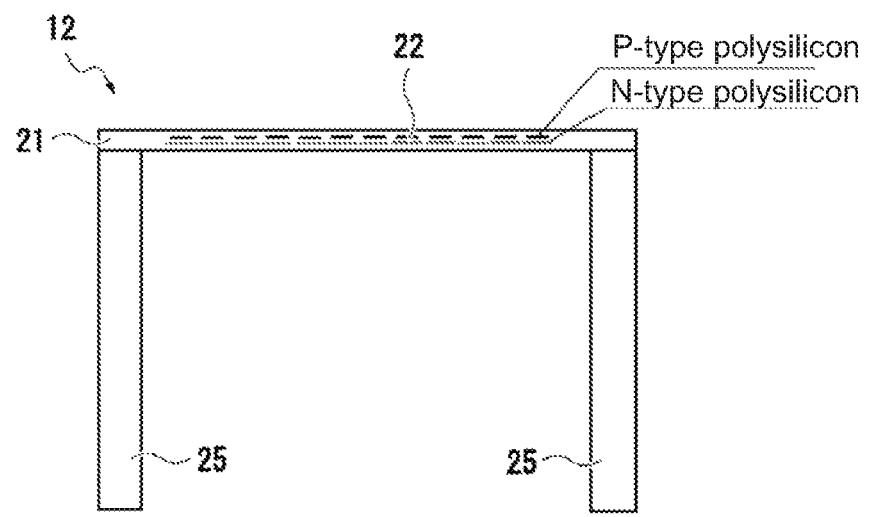
FIG. 2C is a cross-sectional view of the temperature difference sensor taken along line B-B in FIG. 2A.

The components of the temperature difference sensor 12 (12a and 12b) will now be described with reference to FIGS. 2A to 2C. FIG. 2A is a top view of the temperature difference sensor 12. FIG. 2B is a cross-sectional view of the temperature difference sensor 12 taken along line A-A in FIG. 2A, and FIG. 2C is a cross-sectional view of the sensor 12 taken along line B-B in FIG. 2A. The right-left direction herein refers to the right-left direction in FIG. 2A, and the back-forth direction herein refers to the top-down direction in FIG. 2A.

The temperature difference sensor 12 (12a and 12b) is a miniature temperature sensor (heat flux sensor) fabricated with MEMS technology. As shown in FIGS. 2B and 2C, the temperature difference sensor 12 includes a thin film 21 and a support 25 extending downward from a peripheral part of a lower surface of the thin film 21.

The thin film 21 is a laminate formed on a silicon substrate through semiconductor processes. The support 25 is a hollow-square portion formed by etching the back surface of the silicon substrate on which the thin film 21 is formed. The support 25 includes side walls parallel to each other in the back-forth direction (FIG. 2C, hereafter referred to as sub side walls), which are thinner than side walls parallel to each other in the right-left direction (FIG. 2B, hereafter referred to as main side walls).

The thin film 21 contains the thermopile 22, which includes a plurality of thermocouples formed from p-type polysilicon and n-type polysilicon connected in series. As shown in FIG. 2A, the thermopile 22 can measure a temperature difference between a heat discharge part, which is a middle part of the thin film 21 in the right-left direction, and heat entry parts, which are immediately above the main side walls of the thin film 21 in the right-left direction (the side walls of the support 25 parallel in the right-left direction). In other words, the thermopile 22 can measure a temperature difference between the heat discharge part, which is the middle part of the thin film 21 in the right-left direction excluding parts whose temperature is easily affected by heat flux from the sub side walls, and the heat entry parts.

The thin film 21 also contains an infrared absorbing and radiating layer (not shown), which facilitates discharge (releasing) of heat entering the heat entry part from the heat discharge part.

Figure 3A:
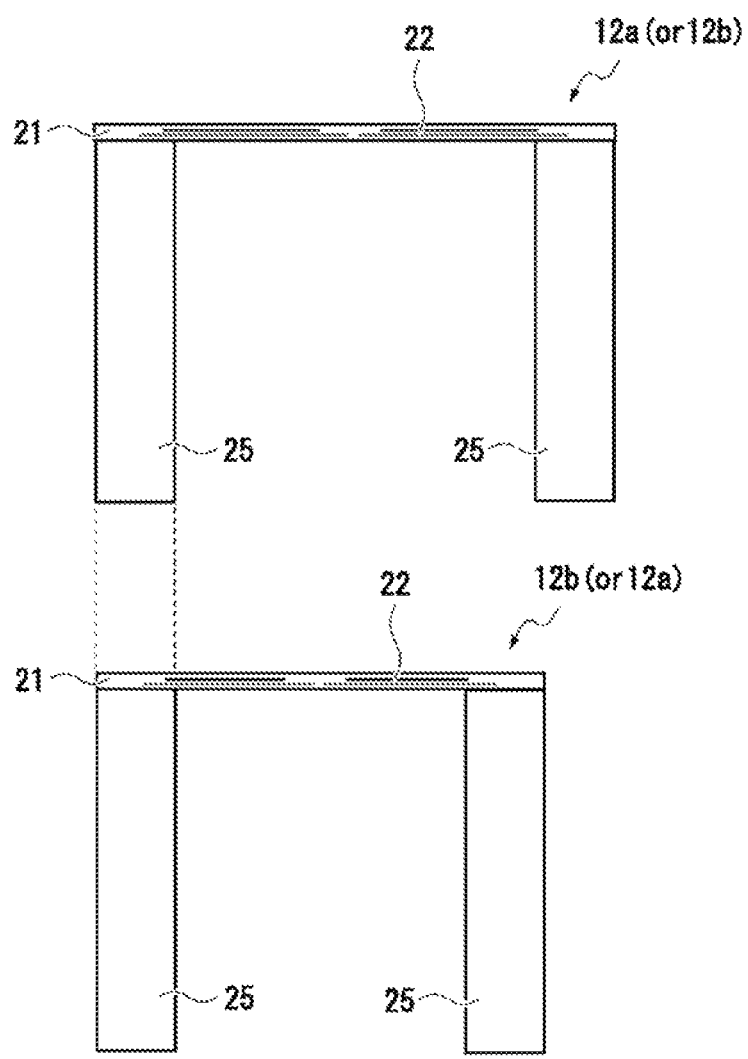
FIG. 3A is a diagram describing two temperature difference sensors with different thermal resistances in their predetermined portions included in the internal temperature measurement device according to the first embodiment.

The temperature difference sensors 12a and 12b included in the internal temperature measurement device 10 each have the structure described above. The internal temperature measurement device 10 uses, as the temperature difference sensors 12a and 12b, two sensors that differ from each other in the thermal resistance of its part from the lower surface of the main side walls of the support 25 to the heat discharge part of the thin film 21. In other words, the temperature difference sensors 12a and 12b may be two sensors including main side walls with the same thickness but with different intervals between them as shown in FIG. 3A. The temperature difference sensors 12a and 12b may also be two sensors including main side walls with different thicknesses and different intervals between them as shown in FIG. 3B, which are formed by removing parts with different sizes from a silicon substrate.

The procedure for calculating the internal temperature performed by the arithmetic circuit 14 will now be described.

Figure 4:
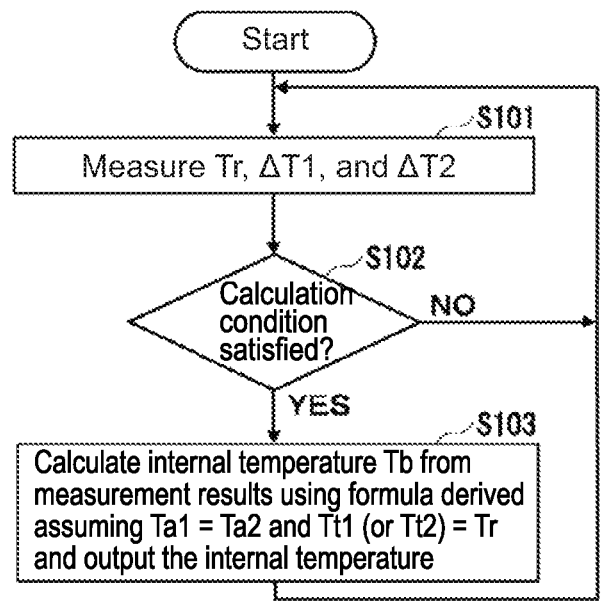
FIG. 4 is a flowchart showing an internal temperature calculation process performed by an arithmetic circuit included in the internal temperature measurement device according to the first embodiment.

FIG. 4 is a flowchart showing an internal temperature calculation process performed by the arithmetic circuit 14. The arithmetic circuit 14 starts the internal temperature calculation process upon receipt of power supplied from a measuring device connected to the terminal 15. Referring to FIG. 4, hereafter, Tr is a temperature measured by the temperature sensor 18, $\Delta T1$ is a temperature difference measured by the temperature difference sensor 12a, and $\Delta T2$ is a temperature difference measured by the temperature difference sensor 12b. Also, Ta1 is the temperature of the heat discharge part of the temperature difference sensor 12a, and Ta2 is the temperature of the heat discharge part of the temperature difference sensor 12b, and Tt1 is the temperature of the heat entry part of the temperature difference sensor 12a, and Tt2 is the temperature of the heat entry part of the temperature difference sensor 12b.

As shown in FIG. 4, the arithmetic circuit 14, which has started measuring the internal temperature, first measures the values of Tr, ΔT1, and ΔT2 (step S101).

Subsequently, the arithmetic circuit 14 determines whether a condition enabling such calculation is satisfied based on the current and past measurement results of, for example, the Tr value (step S102). The condition enabling the calculation is the condition under which the temperature of each part and their temperature differences are stable (with a change in an output from each sensor over time not more than a predetermined value) and the back surface of the substrate 11 is in contact with the surface of the object (the Tr value is not less than a predetermined temperature).

When the condition enabling the calculation is not satisfied (No in step S102), the arithmetic circuit 14 returns to step S101, and measures the values of Tr, ΔT1, and ΔT2 again. When the condition enabling the calculation is satisfied (Yes in step S102), the arithmetic circuit 14 calculates the internal temperature based on the measured values of Tr, ΔT1, and ΔT2 using a formula derived assuming Ta1=Ta2 and Tt1 (or Tt2)=Tr, and outputs the calculated internal temperature (step S103). The arithmetic circuit 14, which has completed the processing in step S103, returns to step 101, and measures the values of Tr, ΔT1, and ΔT2 again.

The formula derived assuming Ta1=Ta2 and Tt1 (or Tt2)=Tr used in the processing in step S103 will now be described.

The arithmetic circuit 14 uses the formula derived assuming Ta1=Ta2 and Tt1=Tr (or is programmed to calculate the internal temperature using the formula derived assuming Ta1=Ta2 and Tt1=Tr) when the temperature sensor 18 (ASIC 13) is arranged nearer the temperature difference sensor 12a than the temperature difference sensor 12b. The arithmetic circuit 14 uses the formula derived assuming Ta1=Ta2 and Tt2=Tr when the temperature sensor 18 is arranged nearer the temperature difference sensor 12b than the temperature difference sensor 12a. The formula used in the first situation and the formula used in the second situation are obtained with substantially the same method. Thus, the formula used when the temperature sensor 18 is arranged nearer the temperature difference sensor 12a than the temperature difference sensor 12b will now be described.

In the example described below, the internal temperature measurement device 10 includes two sensors each including main side walls with the same thickness but with different intervals between the main side walls (FIG. 3A).

Figure 5:
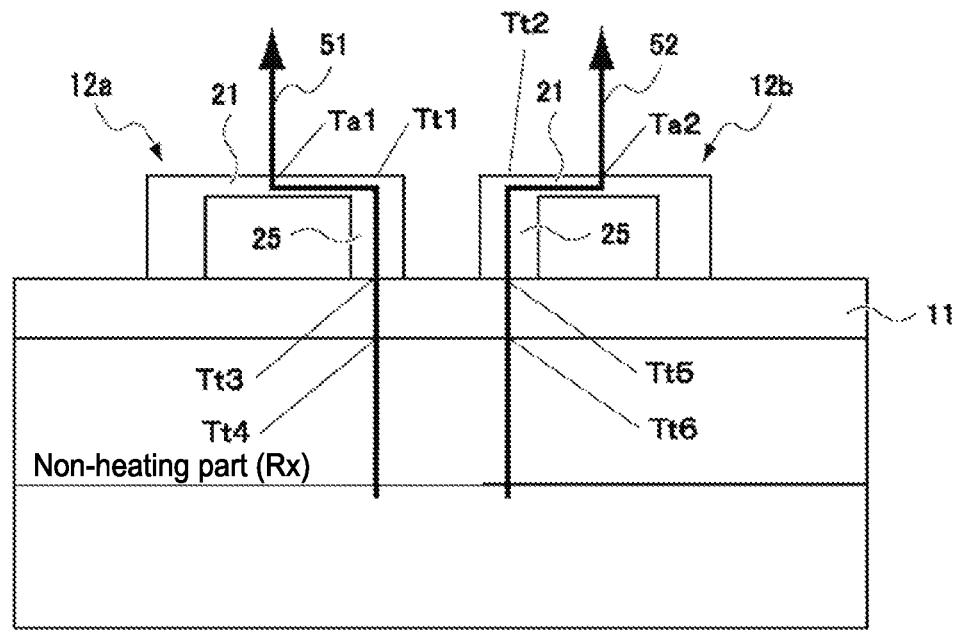
FIG. 5 is a diagram describing two heat transfer paths through the internal temperature measurement device according to the first embodiment as well as through an object to be measured.
Figure 6:
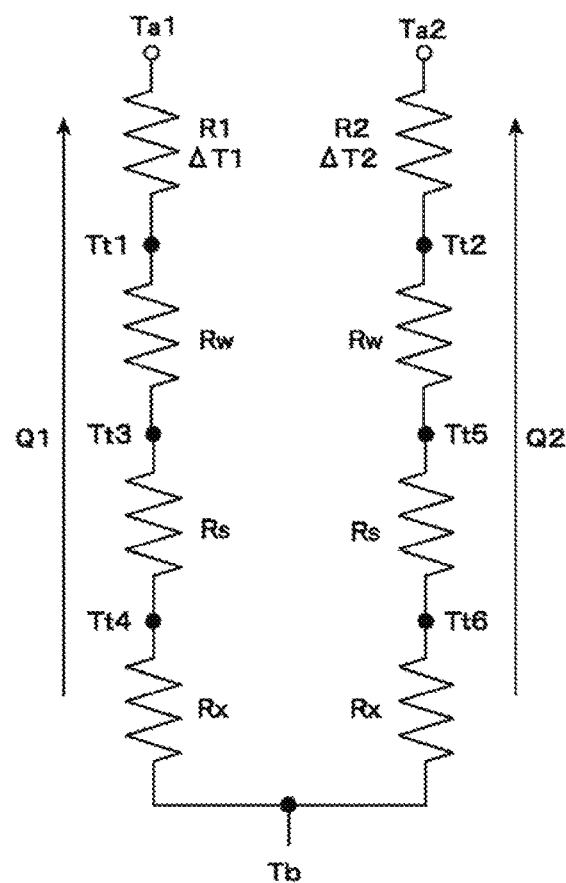
FIG. 6 is a diagram describing a heat equivalent circuit for the two heat transfer paths shown in FIG. 5.

The structure shown in FIG. 5 includes heat transfer paths 51 and 52 with a heat equivalent circuit shown in FIG. 6. In FIG. 6, R1 is the thermal resistance of a part of the thin film 21 in the temperature difference sensor 12a overlapping with the heat transfer path 51 (a part that functions as a part of the heat transfer path 51. R2 is the thermal resistance of a part of the thin film 21 in the temperature difference sensor 12b overlapping with the heat transfer path 52. Rw is the thermal resistance of a part of each main side wall of the temperature difference sensor 12a overlapping with the heat transfer path 51, and is also the thermal resistance of each main side wall of the temperature difference sensor 12b overlapping with the heat transfer path 52. Rs is the thermal resistance of a part of the substrate 11 overlapping with the heat transfer path 51, and is also the thermal resistance of a part of the substrate 11 overlapping with the heat transfer path 52. Rx is the thermal resistance of a part of a non-heating part overlapping with the heat transfer path 51, and is also the thermal resistance of the non-heating part overlapping with the heat transfer path 52.

Figure 7:
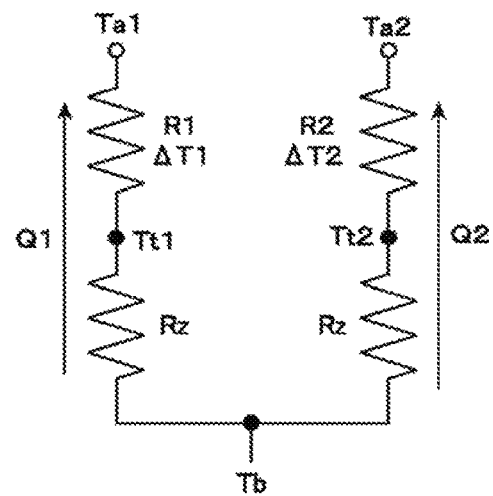
FIG. 7 is a diagram describing the simplified version of the heat equivalent circuit shown in FIG. 6.

When Rw+Rs+Rx is written as Rz, the heat equivalent circuit shown in FIG. 6 is simplified into the heat equivalent circuit shown in FIG. 7.

The six formulas below hold for this heat equivalent circuit.

$$\Delta T1 = Tt1 - Ta1 \tag{1.1}$$

$$\Delta T1 = R1 \cdot Q1 \tag{1.2}$$

$$\Delta T2 = Tt2 - Ta2 \tag{1.3}$$

$$\Delta T2 = R2 \cdot Q2 \tag{1.4}$$

$$Tb - Tt1 = Rz \cdot Q1 \tag{1.5}$$

$$Tb - Tt2 = Rz \cdot Q2 \tag{1.6}$$

Eight unknown numbers (Q1, Q2, Ta1, Tt2, Tt1, Ta2, Rz, and Tb) are included in the six formulas. In this case, these unknown numbers cannot be calculated using the above six formulas.

When the temperature sensor 18 is arranged nearer the temperature difference sensor 12b than a temperature difference sensor 12ab, the temperature Tr measured by the temperature sensor 18 approaches the temperature Tt1. This can assume the formulas below (in other words, the Tt1 value can be approximated to the Tr value).

$$Tt1 = Tr \tag{1.7}$$

When Formula 1.8 below is assumed to hold (in other words, the Ta1 value is approximated to the Ta2 value), as many equations as the unknown numbers (Formulas 1.1 to 1.8) can be defined.

$$Ta1 = Ta2 \tag{1.8}$$

When the two sensors each include main side walls with the same thickness but with different intervals between the main side walls (FIG. 3A), the formula derived assuming Ta1=Ta2 and Tt1=Tr is a formula obtained by solving simultaneous equations including Formulas 1.1 to 1.8 for Tb. In other words, Formula A1 below is used.

Formula 3

$$Tb = Tr + \frac{R2(\Delta T2 - \Delta T1)\Delta T1}{R1 \cdot \Delta T2 - R2 \cdot \Delta T1} \tag{A1}$$

Formula A1 can be transformed into Formula A2 below using the ratio k of R2 to R1 (=R2/R1).

Formula 4

$$Tb = Tr + \frac{k(\Delta T2 - \Delta T1)\Delta T1}{\Delta T2 - k \cdot \Delta T1} \tag{A2}$$

Formula A2 above may be used as the formula derived assuming Ta1=Ta2 and Tt1=Tr when the two sensors each include main side walls with the same thickness but with different intervals between the main side walls (FIG. 3A). The ratio k of R2 to R1 is substantially equal to the ratio of the intervals between the main side walls of the two temperature difference sensors 12. The use of Formula A2 as the above formula eliminates calculation of the values R1 and R2 based on the thermal conductivity and the size of each component of the thin film 21 when the internal temperature measurement device 10 is manufactured.

In the example described below, the internal temperature measurement device 10 uses two sensors including main side walls with different thicknesses and different intervals between them (refer to FIG. 3B).

The internal temperature measurement device 10 uses the temperature difference sensors 12a and 12b shown in FIG. 3B. The thickness of the main side walls included in the temperature difference sensor is 1/m (m>1) times thicker than the thickness of the main side walls included in the temperature difference sensor 12b.

Figure 8A:
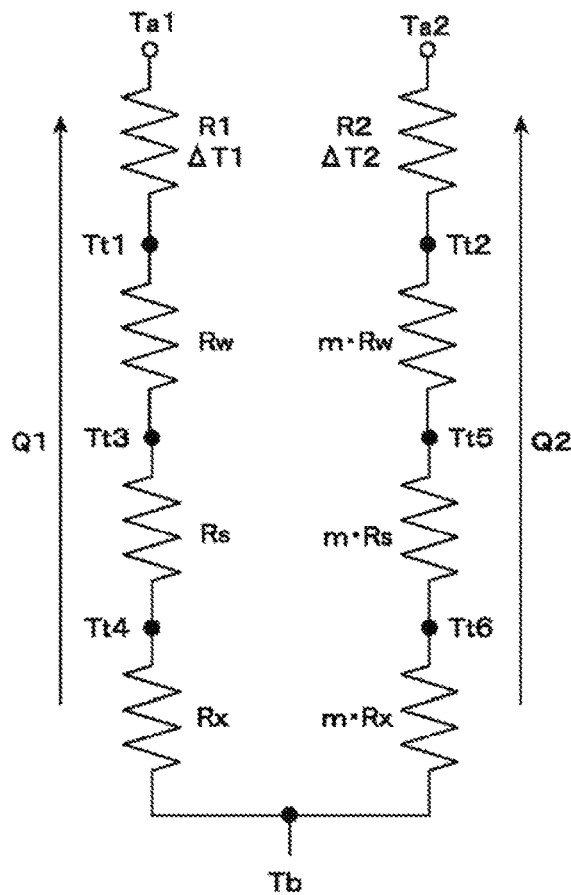
FIG. 8A is a diagram describing a heat equivalent circuit for the two temperature difference sensors whose main side wall portions have different thicknesses.
Figure 8B:
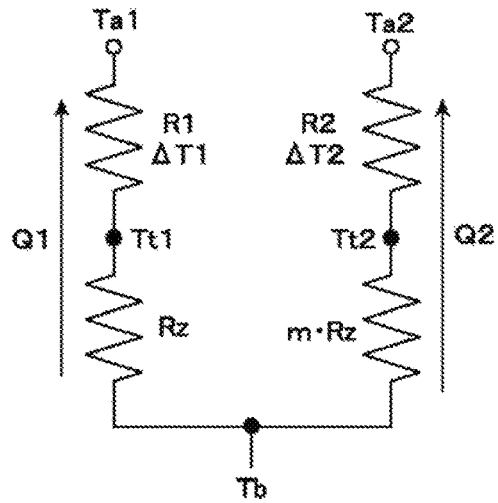
FIG. 8B is a diagram describing the simplified version of the heat equivalent circuit shown in FIG. 8A.

FIG. 8A shows the heat equivalent circuit for this structure. When Rw+Rs+Rx is written as Rz, the heat equivalent circuit shown in FIG. 8A is simplified into the heat equivalent circuit shown in FIG. 8B.

The six formulas below hold for this heat equivalent circuit.

$$\Delta T1 = Tt1 - Ta1 \quad (2.1)$$

$$\Delta T1 = R1 \cdot Q1 \quad (2.2)$$

$$\Delta T2 = Tt2 - Ta2 \quad (2.3)$$

$$\Delta T2 = R2 \cdot Q2 \quad (2.4)$$

$$Tb - Tt1 = Rz \cdot Q1 \quad (2.5)$$

$$Tb - Tt2 = m \cdot Rz \cdot Q2 \quad (2.6)$$

If these six formulas are derived assuming Tt1=Tr and Ta1=Ta2, the unknown numbers can be calculated using the six formulas. The arithmetic circuit thus uses Formula A3 below as the formula derived assuming Ta1=Ta2 and Tt1=Tr.

Formula 5

$$Tb = Tr + \frac{R2(\Delta T2 - \Delta T1)\Delta T1}{m \cdot R1 \cdot \Delta T2 - R2 \cdot \Delta T1} \quad (A3)$$

Using the ratio k of R2 to R1 (=R2/R1), Formula A3 can be also transformed into Formula A4 below without R1 and R2.

Formula 6

$$Tb = Tr + \frac{k(\Delta T2 - \Delta T1)\Delta T1}{m \cdot \Delta T2 - k \cdot \Delta T1} \quad (A4)$$

Formula A4 may be used as the formula derived assuming Ta1=Ta2 and Tt1=Tr to eliminate calculation of the values R1 and R2 based on the thermal conductivity and the size of each component of the thin film 21 when the internal temperature measurement device 10 is manufactured.

The two sensors that differ from each other in the thermal resistance of its part from the lower surface of the main side walls to the heat discharge part of the thin film 21 may be sensors that differ in the height of the main side walls (the length in the top-down direction in FIG. 1), sensors that differ in the height of the main side walls and in the interval between the main side walls, and sensors that differ in the material for the main side walls, other than the sensors described above.

Figure 9:
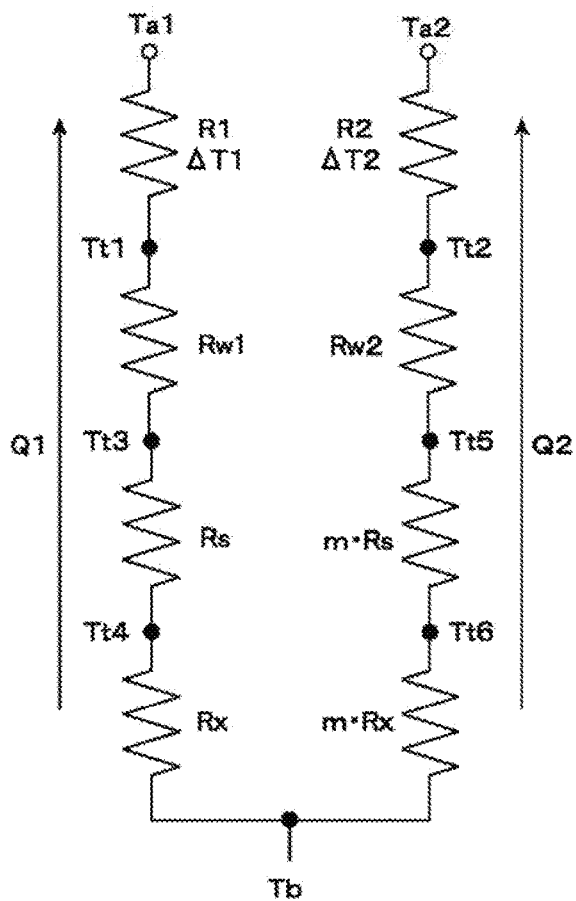
FIG. 9 is a diagram describing a heat equivalent circuit for the two temperature difference sensors whose main side wall portions have different heights.

When the internal temperature measurement device 10 includes two such sensors, the formula derived assuming Ta1=Ta2 and Tt1=Tr may be a group of equations derived from the heat equivalent circuit shown in FIG. 9, and the formula for calculating the value of Tb derived assuming Ta1=Ta2 and Tt1=Tr. In FIG. 9, Rw1 and Rw2 indicate the thermal resistance of the main side walls of the temperature difference sensor 12a (thermal resistance of a part of the main side walls overlapping with the heat transfer path for which the heat flux is to be evaluated), and also the thermal resistance of the main side walls of the temperature difference sensor 12b. In the same manner as in FIG. 8, m is the ratio of the thickness of the main side walls of the temperature difference sensor 12a to the thickness of the main side walls of the temperature difference sensor 12b.

The group of equations derived from the heat equivalent circuit shown in FIG. 9 and the formula for calculating the value of Tb derived assuming Ta1=Ta2 and Tt1=Tr include Rw1 and Rw2 and other values (e.g., the value of Rw1 and the value of Rw2/RW1) as parameters.

The above formulas A1 to A4 do not include Rw1, Rw2, and other values as parameters. In this case, the internal temperature measurement device 10 may include two sensors without the need to calculate the values of Rw1 and Rw2, such as two sensors including main side walls with the same thickness but with different intervals between the main side walls or two sensors including main side walls with different thicknesses and different intervals between the main side walls. To fabricate the two sensors including main side walls with the same thickness but with a different interval between the main side walls, one temperature difference sensor 12 (12a or 12b) is to be newly designed. For the two sensors including main side walls with different thicknesses and different intervals between the main side walls, the temperature difference sensors 12 can be fabricated simply by removing parts with different sizes from a silicon substrate In the fabrication process of one of the two sensors. The internal temperature measurement device 10 may thus use two sensors including main side walls with different intervals between the main side walls by removing parts with different sizes from a silicon substrate.

As described above, the internal temperature measurement device 10 according to the present embodiment can measure (calculate) the internal temperature Tb of an object in a manner to reflect a decrease in the temperature caused by a non-heat generating part at its surface side having an unknown thermal resistance Rx. The internal temperature measurement device 10 uses the temperature difference $\Delta T1$ measured by the thermopile 22 in the temperature difference sensor 12a, the temperature difference $\Delta T2$ measured by the thermopile 22 in the temperature difference sensor 12b, and the temperature Tr measured by the temperature sensor 18 as the measured values for calculating the internal temperature Tb. More specifically, the internal temperature measurement device 10 obtains information for calculating the internal temperature Tb with the single temperature sensor 18 and the two thermopiles 22.

The internal temperature measurement device 10 can thus measure the temperature difference more accurately using the thermopile 22 than when using two temperature sensors. Without using a plurality of temperature sensors, the measurement device does not accumulate an error caused by an error (individual difference) between the temperature sensors. The internal temperature measurement device 10 according to the present embodiment can thus measure the internal temperature of an object including a non-heating part at its surface side having an unknown thermal resistance more accurately than existing structures.

Further, the temperature difference sensors 12 in the internal temperature measurement device 10 according to the present embodiment are miniature sensors fabricated using MEMS technology. The internal temperature measurement device 10 according to the present embodiment can thus measure the internal temperature of an object with higher responsiveness than existing structures.

Second Embodiment

Figure 10:
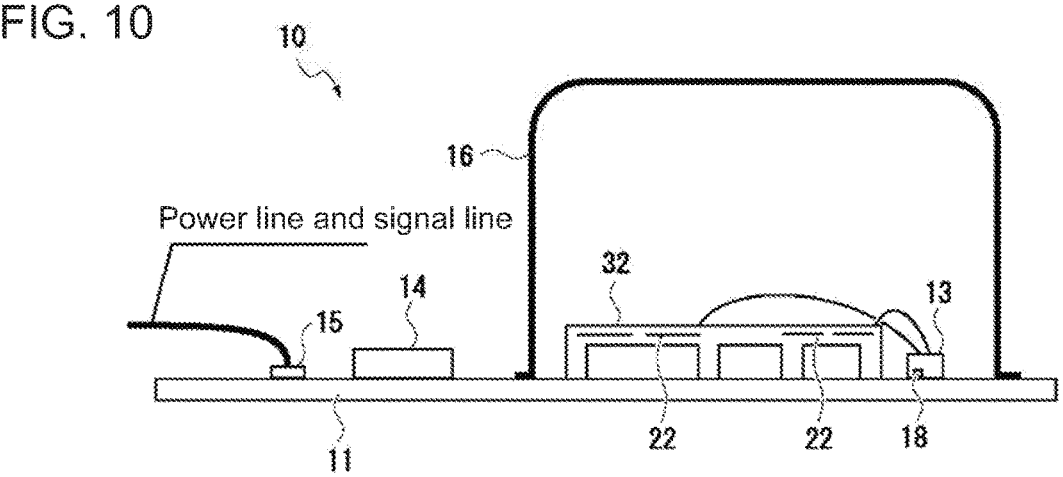
FIG. 10 is a schematic diagram showing the structure of an internal temperature measurement device according to a second embodiment of the present invention.

FIG. 10 is a schematic diagram showing the structure of an internal temperature measurement device 10 according to a second embodiment of the present invention.

The internal temperature measurement device 10 according to the present embodiment has the same structure as the internal temperature measurement device 10 according to the first embodiment except that the two temperature difference sensors 12a and 12b (refer to FIG. 1) are replaced with one temperature difference sensor 32.

Figure 11:
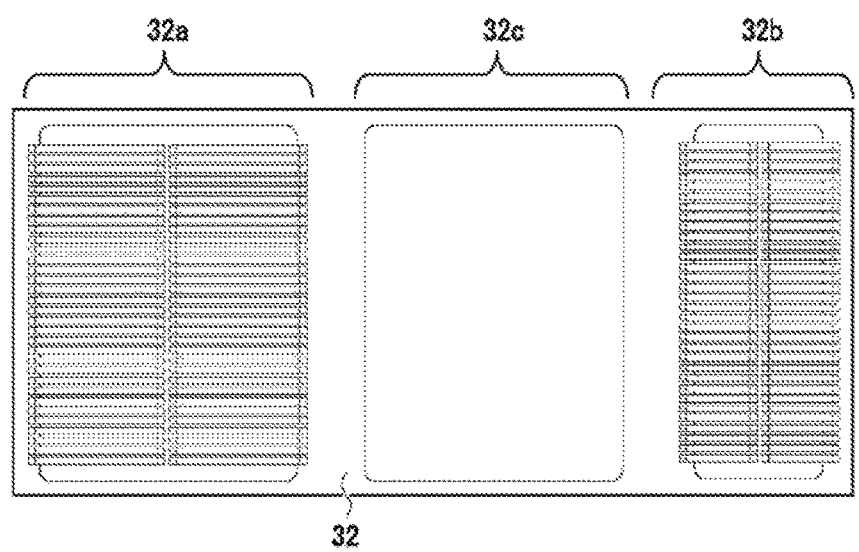
FIG. 11 is a top view of a temperature difference sensor included in the internal temperature measurement device according to the second embodiment.

As shown in FIG. 11, the temperature difference sensor 32 includes a sensor unit 32a, a sensor unit 32b, and a connection unit 32c, which physically connects the sensor unit 32a and the sensor unit 32b. The temperature difference sensor 32 differs from the temperature difference sensor 12a only in that the sensor unit 32a is connected to the connection unit 32c. Likewise, the temperature difference sensor 32 differs from the temperature difference sensor 12b only in that the sensor unit 32b is connected to the connection unit 32c.

In other words, each sensor unit 32x (x=a or b) of the temperature difference sensor 32 is a thin film including a heat discharge part and a heat entry part. The thin film contains the thermopile 22 to measure the temperature difference between the heat discharge part and the heat entry part. Each sensor unit 32x further includes a support including two main side walls, which are each immediately below the heat entry part, and extending downward from a peripheral part of the thin film. The sensor units 32a and 32b differ from each other in the thermal resistance of their parts extending from the lower surface of the main side walls to the heat discharge part of the thin film.

The connection unit 32c in the temperature difference sensor 32 has the same structure as the temperature difference sensors 12 without including the thermopile 22. More specifically, the connection unit 32c is mostly a thin film (a light gray area). Thus, less heat is transferred through the connection unit 32c from the sensor unit 32a to the sensor unit 32b, or from the sensor unit 32b to the sensor unit 32a.

The internal temperature measurement device 10 according to the present embodiment uses the temperature difference sensor 32 with the structure described above instead of the temperature difference sensors 12a and 12b. The internal temperature measurement device 10 according to the present embodiment can thus measure the internal temperature Tb with the same accuracy as the internal temperature measurement device 10 according to the first embodiment. The internal temperature measurement device 10 with fewer components to be mounted on the substrate 11 allows easier assembly than the internal temperature measurement device 10 according to the first embodiment.

Figure 12:
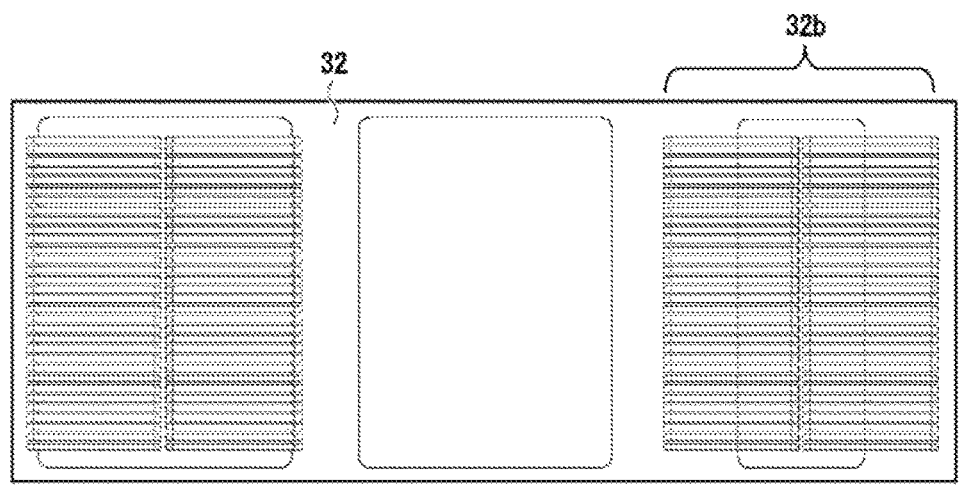
FIG. 12 is a top view of another temperature difference sensor included in the internal temperature measurement device according to the second embodiment.
Figure 13:
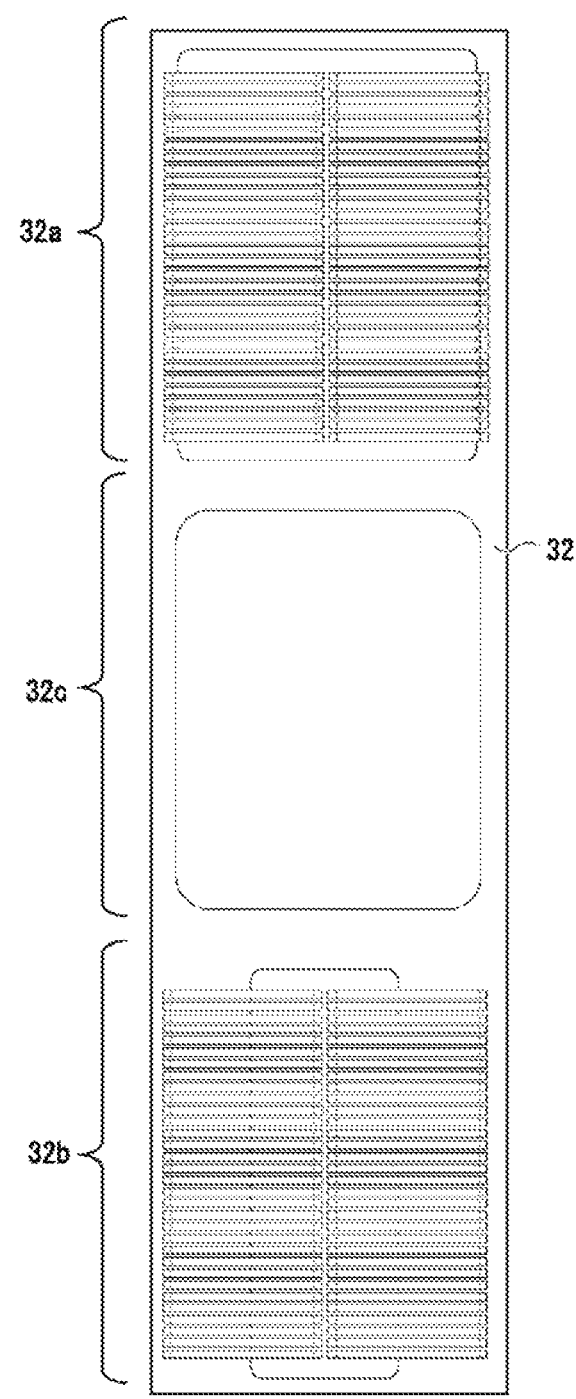
FIG. 13 is a top view of another temperature difference sensor included in the internal temperature measurement device according to the second embodiment.

Although the temperature difference sensor 32 includes the sensor unit 32b corresponding to the temperature sensor 12b with a shorter interval between the main side walls as shown in FIG. 11, the temperature difference sensor 32 may include a sensor unit 32b corresponding to the temperature sensor 12b with thicker main side walls as shown in FIG. 12. As shown in FIG. 13, the temperature difference sensor 32 may further be a sensor including a sensor unit 32a, a connection unit 32c, and a sensor unit 32b aligned in a direction perpendicular to the direction in which the temperature difference is measured.

Third Embodiment

Figure 14:
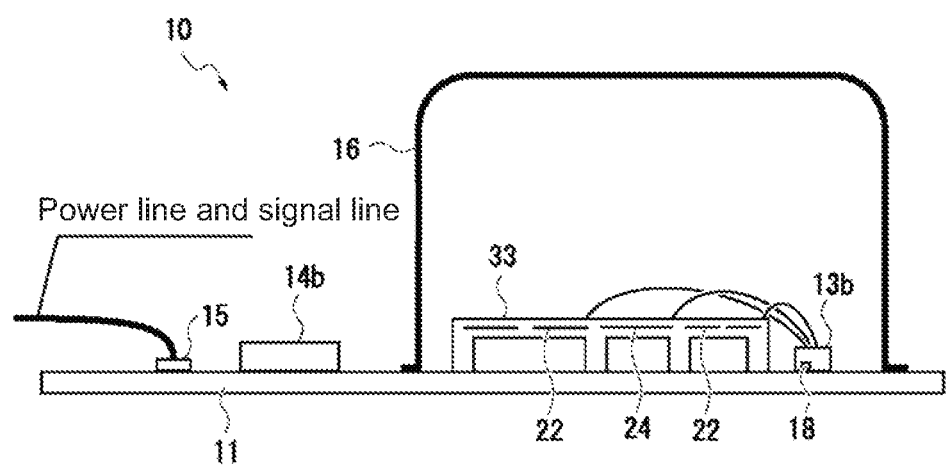
FIG. 14 is a schematic diagram showing the structure of an internal temperature measurement device according to a third embodiment of the present invention.

FIG. 14 is a schematic diagram showing the structure of an internal temperature measurement device 10 according to a third embodiment of the present invention.

The internal temperature measurement device 10 according to the present embodiment has the same structure as the internal temperature measurement device 10 (FIG. 10) according to the second embodiment except that the temperature difference sensor 32, the ASIC 13, and the arithmetic circuit 14 are replaced with a temperature difference sensor 33, an ASIC 13b, and an arithmetic circuit 14b.

Figure 15:
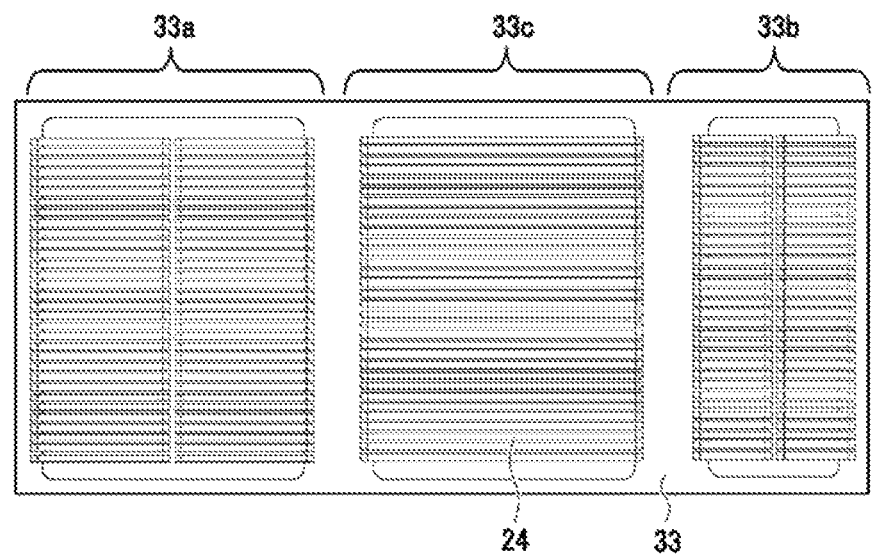
FIG. 15 is a top view of a temperature difference sensor included in the internal temperature measurement device according to the third embodiment.

As shown in FIG. 15, the temperature difference sensor 33 includes a sensor unit 33a, a sensor unit 33b, and a connection unit 33c. The connection unit 33c physically connects the sensor unit 33a and the sensor unit 33b. The sensor unit 33a and the sensor unit 33b in the temperature difference sensor 33 are the same as the sensor unit 32a and the sensor unit 32b in the temperature difference sensor 32 described above.

The connection unit 33c includes a thermopile 24, in the same manner as the temperature difference sensors 12. As shown in FIG. 15, the thermopile 24 included in the connection unit 33c measures the temperature difference between a heat entry part of the sensor unit 33a and a heat entry part of the sensor unit 33b (between an end of the connection unit 33c adjacent to the sensor unit 33a and an end of the connection unit 33c adjacent to the sensor unit 33b).

Figure 16:
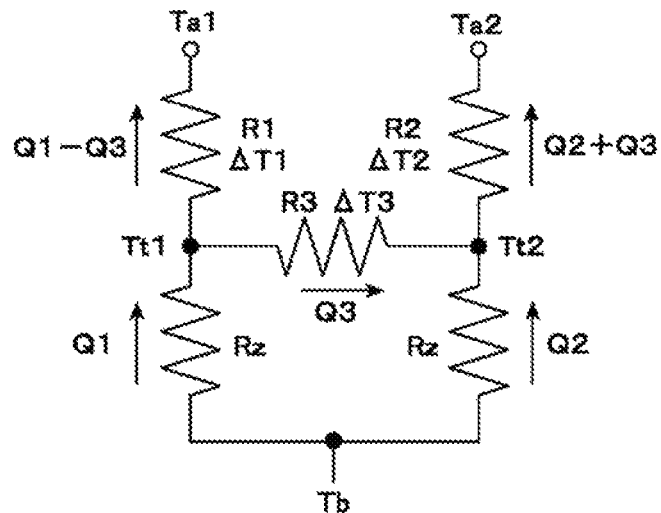
FIG. 16 is a diagram describing a heat equivalent circuit for the internal temperature measurement device according to the third embodiment.

More specifically, the thermopile 24 in the temperature difference sensor 33 can measure the value of $\Delta T3$ ($=Tt1-Tt2$) in the heat equivalent circuit shown in FIG. 16. Referring to FIG. 16, Tr is a temperature measured by the temperature sensor 18, $\Delta T1$ is a temperature difference measured by the thermopile 22 in the sensor unit 33a, and $\Delta T2$ is a temperature difference measured by the thermopile 22 in the sensor unit 33b. Also, Ta1 is the temperature of the heat discharge part of the sensor unit 33a, and Tt1 is the temperature of the heat entry part of the sensor unit 33a, whereas Ta2 is the temperature of the heat discharge part of the sensor unit 33b, and Tt2 is the temperature of the heat entry part of the sensor unit 33b.

The ASIC 13b is an integrated circuit obtained by improving the ASIC 13 to further amplify and digitize an output from the thermopile 24.

Figure 17:
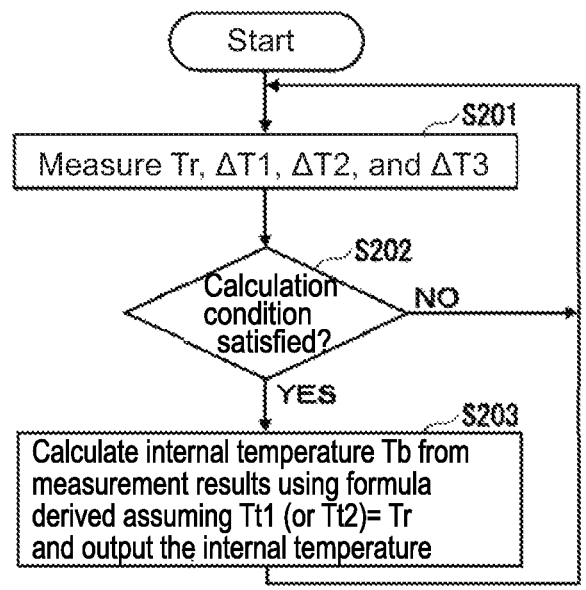
FIG. 17 is a flowchart showing an internal temperature calculation process performed by an arithmetic circuit included in the internal temperature measurement device according to the third embodiment.

The arithmetic circuit 14b is a circuit obtained by modifying the arithmetic circuit 14 to perform an internal temperature calculation process shown in FIG. 17.

More specifically, the arithmetic circuit 14b, which has started the internal temperature calculation process, first measures the values of Tr, $\Delta T1$, $\Delta T2$, and $\Delta T3$ (step S201).

The arithmetic circuit 14b, which has completed the processing in step S201, determines whether a condition enabling such calculation described above is satisfied based on the current and past measurement results of, for example, the Tr value (step S202).

When the condition enabling the calculation is not satisfied (No in step S202), the arithmetic circuit 14b returns to step S201, and measures the values of Tr, $\Delta T1$, $\Delta T2$, and $\Delta T3$ again. When the condition enabling the calculation is satisfied (Yes in step S202), the arithmetic circuit 14b calculates the internal temperature based on the measured values of Tr, $\Delta T1$, $\Delta T2$, and $\Delta T3$ using a formula derived assuming Tt1 (or Tt2)=Tr, and outputs the calculated internal temperature (step S203). The arithmetic circuit 14b, which has completed the processing in step S203, returns to step 201 and measures, for example, the values of Tr, and ΔT1 again.

The formula derived assuming Tt1 (or Tt2)=Tr will now be described. In the same manner as the arithmetic circuit 14, the arithmetic circuit 14b normally uses the formula derived assuming Tt1=Tr when the temperature sensor 18 is arranged nearer the sensor unit 33a than the sensor unit 33b. The arithmetic circuit 14b normally uses the formula derived assuming Tt2=Tr when the temperature sensor 18 is arranged nearer the sensor unit 32b than the sensor unit 33a. As in the first embodiment, the formula derived assuming Tt1=Tr used when the temperature sensor 18 is arranged nearer the sensor unit 32a than the sensor unit 33b will now be described.

When the internal temperature measurement device 10 includes the temperature difference sensor 33 including the two sensor units 33a and 33b each including the main side walls with the same thickness but with a different interval between the main side walls, Formula A5, A6, or A7 below is used as the formula derived assuming that Tt1=Tr.

Formula 7

$$Tb = Tr + \frac{(-R2 \cdot R3 \cdot \Delta T1 - R1 \cdot R2 \cdot \Delta T3)\Delta T3}{R2 \cdot R3 \cdot \Delta T1 + 2R1 \cdot R2 \cdot \Delta T3 - R1 \cdot R3 \cdot \Delta T2} \quad (A5)$$

$$Tb = Tr + \frac{-R2 \cdot \Delta T1 \cdot \Delta T3}{R2 \cdot \Delta T1 - R1 \cdot \Delta T2} \quad (A6)$$

$$Tb = Tr + \frac{-k \cdot \Delta T1 \cdot \Delta T3}{k \cdot \Delta T1 - \Delta T2} \quad (A7)$$

Among these formulas, Formula A5 is obtained by solving the eight formulas below derived from the heat equivalent circuit shown in FIG. 16 for Tb using the value of Tt1 as a known number and then replacing Tt1 with Tr.

$$\Delta T1 = Tt1 - Ta1 \quad (3.1)$$

$$\Delta T1 = R1 \cdot (Q1 - Q3) \quad (3.2)$$

$$\Delta T2 = Tt2 - Ta2 \quad (3.3)$$

$$\Delta T2 = R2 \cdot (Q2 + Q3) \quad (3.4)$$

$$\Delta T3 = Tt1 - Tt2 \quad (3.5)$$

$$\Delta T3 = R3 \cdot Q3 \quad (3.6)$$

$$Tb - Tt1 = Rz \cdot Q1 \quad (3.7)$$

$$Tb - Tt2 = Rz \cdot Q2 \quad (3.8)$$

Formula A6 is obtained by eliminating R3 from Formula A5, when R3>>R1 and R2, or ΔT3<<ΔT1 and ΔT2.

Formula A7 is obtained by eliminating R1 and R2 from Formula A6 using R2/R1=k.

The value of Tb calculated using Formula A5 and the value of Tb calculated using Formula A7 often do not vary greatly. When Formula A5 is used, the values of R1 to R3 are to be obtained. When Formula A7 is used, the value of k alone is to be obtained to calculate the value of Tb. Formula A7 may thus be used as the formula derived assuming Tt1=Tr.

Figure 18:
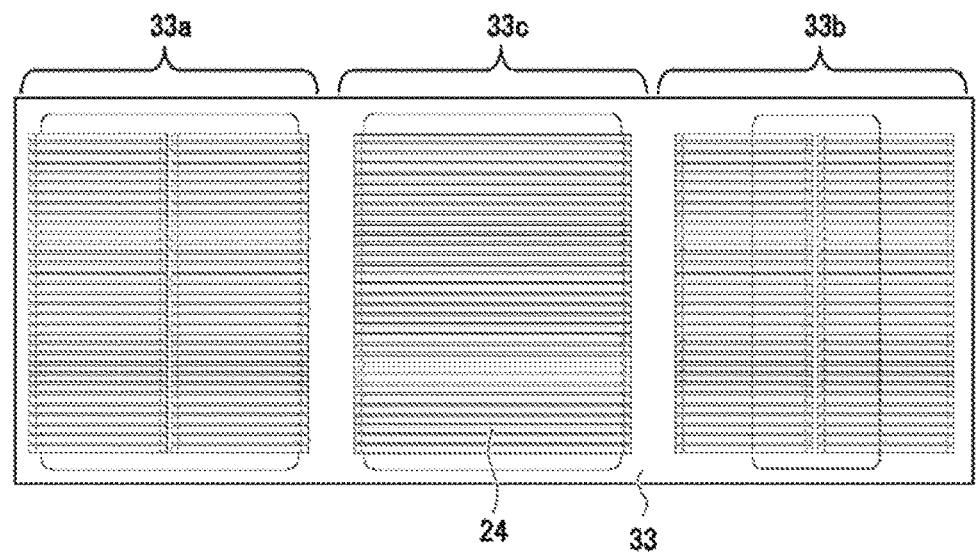
FIG. 18 is a top view of another temperature difference sensor included in the internal temperature measurement device according to the third embodiment.

When the internal temperature measurement device 10 includes the temperature difference sensor 33 including the two sensor units 33a and 33b each including the main side walls with different thicknesses and different intervals between the main side walls as shown in FIG. 18, the formulas below are used as the formula derived assuming Tt1=Tr.

Instead of Formula 3.8 (or Formula 3.7), a first formula obtained by solving a simultaneous equation including a formula in which the right side of Formula 3.8 (or Formula 3.7) multiplied by a proportional coefficient for Tb using the value of Tt1 as a known number and then replacing Tt1 with Tr.

A second formula obtained by eliminating R3 from the first formula using R3>>R1 and R2 or ΔT3<<ΔT1 and ΔT2.

A third formula obtained by eliminating R1 and R2 from the second formula using R2/R1=k.

When the internal temperature measurement device 10 includes the temperature difference sensor 33 including the sensor units 32a and 32b each including the main side walls with different heights, the formula derived assuming Tt1=Tr may be a group of equations derived from a heat equivalent circuit obtained by adding a resistance corresponding the connection unit 33c between junctions indicated by Tt1 and Tt2 in the heat equivalent circuit shown in FIG. 9, and the formula for calculating Tb derived assuming Tt1=Tr.

As described above, the internal temperature measurement device 10 according to the present embodiment calculates the internal temperature Tb without assuming Ta1=Ta2. The internal temperature measurement device 10 according to the present embodiment can thus calculate the internal temperature Tb more accurately than the internal temperature measurement device 10 according to the first or second embodiment described above that calculates the internal temperature Tb assuming Ta1=Ta2.

Fourth Embodiment

Figure 19:
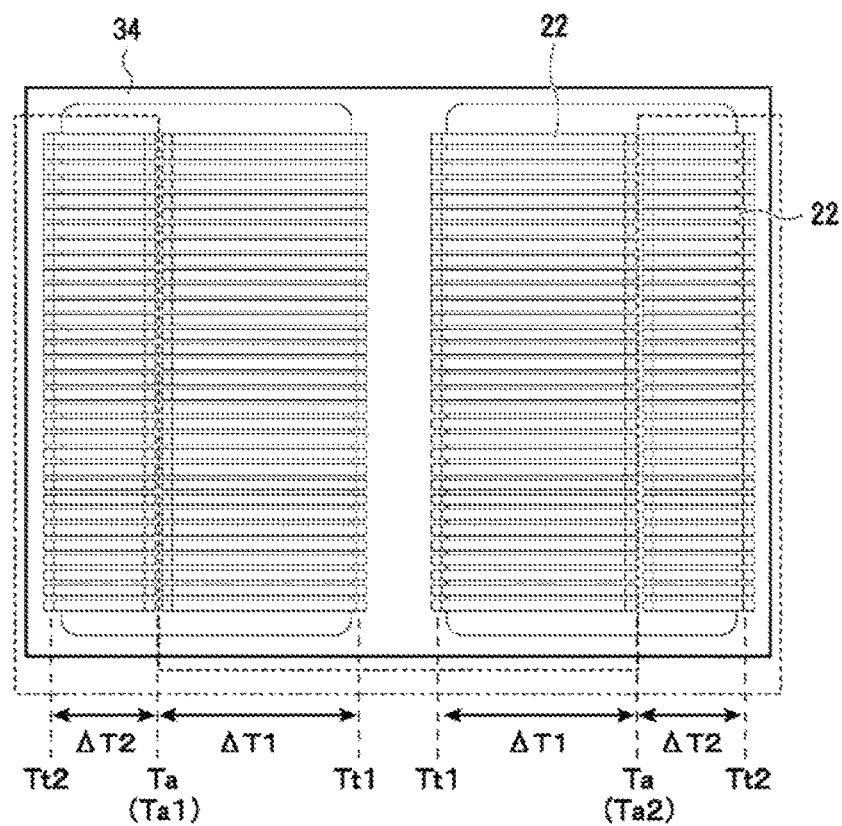
FIG. 19 is a top view of a temperature difference sensor included in an internal temperature measurement device according to a fourth embodiment of the present invention.

An internal temperature measurement device 10 according to the present embodiment has the same structure as the internal temperature measurement device 10 according to the first embodiment except that the temperature difference sensors 12a and 12b are replaced with a temperature difference sensor 34 formed as shown in FIG. 19.

The left half or the right half of this temperature difference sensor 34 in FIG. 19 corresponds to the temperature difference sensor 12 (refer to FIGS. 2A to 2C) in which the heat discharge part is arranged nearer one of the main side walls. A group of thermocouples mounted on the left side of the left half of the temperature difference sensor 34 is connected in series to a group of thermocouples mounted on the right side of the right half of the temperature difference sensor 34. A group of thermocouples mounted on the right side of the left half of the temperature difference sensor 34 is connected in series to a group of thermocouples mounted on the left side of the right half of the temperature difference sensor 34.

The temperature difference sensor 34 includes the group of thermocouples split into two in its middle part as the thermopile 22 for measuring the temperature difference ΔT1 (=Tt1−Ta), and the group of thermocouples split into two on its two ends as the thermopile 22 for measuring the temperature difference ΔT2.

In the temperature difference sensor 34, a group of cold junctions of the thermocouples included in one thermopile 22 and a group of cold junctions of the thermocouples included in the other thermopile 22 are arranged in areas with substantially equal temperatures. Thus, the internal temperature measurement device 10 including the temperature difference sensor 34 has the heat equivalent circuit shown in FIG. 20. This heat equivalent circuit satisfies the condition under which the width (length in the right-left direction) of the main side wall (corresponding to the main side walls of the two temperature difference sensors 12 arranged adjacent to each other) in the middle of the temperature difference sensor 34 is twice the width of each of the main side walls arranged on the right and left ends of the temperature difference sensor 34 shown in FIG. 19.

Figure 20:
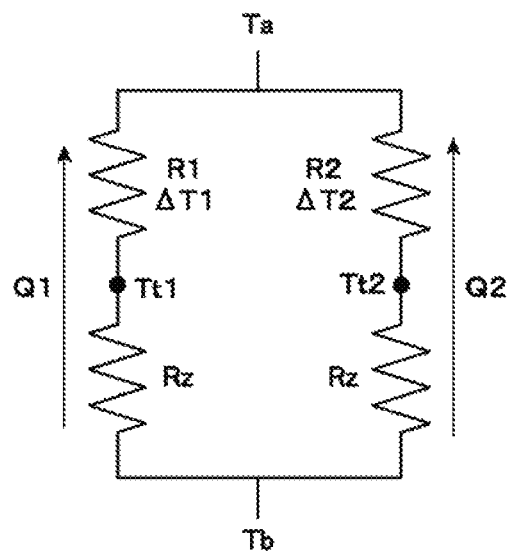
FIG. 20 is a diagram describing a heat equivalent circuit for the internal temperature measurement device according to the fourth embodiment.

The six formulas below hold for the heat equivalent circuit shown in FIG. 20.

$$\Delta T1 = Tt1 - Ta \quad (4.1)$$

$$\Delta T1 = R1 \cdot Q1 \quad (4.2)$$

$$\Delta T2 = Tt2 - Ta \quad (4.3)$$

$$\Delta T2 = R2 \cdot Q2 \quad (4.4)$$

$$Tb - Tt1 = Rz \cdot Q1 \quad (4.5)$$

$$Tb - Tt2 = Rz \cdot Q2 \quad (4.6)$$

These six formulas are equivalent to the formulas obtained by adding the formula Ta1=Ta2=Ta to Formulas 1.1 to 1.6 described above.

The temperature difference sensor 34 including the temperature sensor 34 can thus calculate the internal temperature Tb using Formula A1 or Formula A2 described above.

Figure 21:
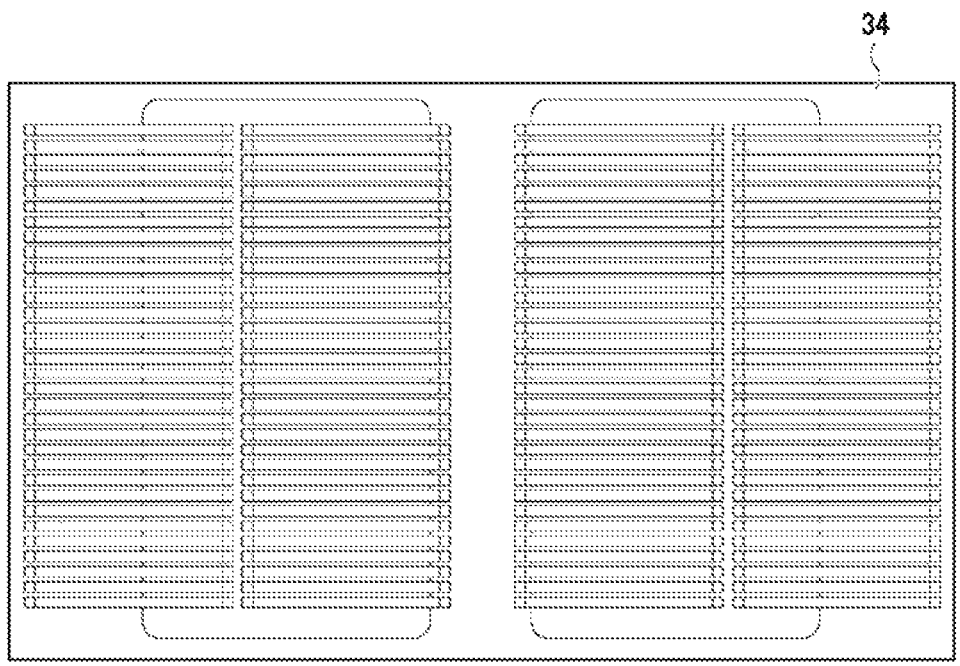
FIG. 21 is a top view of another temperature difference sensor included in the internal temperature measurement device according to the fourth embodiment.

The internal temperature measurement device 10 including the temperature difference sensor 34 with the structure shown in FIG. 21 can calculate the internal temperature Tb using Formula A3 or Formula A4 described above.

When the main side wall in the middle and the main side walls in its ends are formed from different materials, the internal temperature measurement device 10 can calculate the internal temperature Tb using a group of equations derived from the equivalent circuit connecting the junctions indicated by Ta1 and Ta2 in the heat equivalent circuit shown in FIG. 9, and using the formula derived from Tt1=Tr.

The arithmetic circuit 14 in the internal temperature measurement device 10 according to the first embodiment uses the formula derived assuming Ta1=Ta2, and Tt1 (or Tt2)=Tr for calculating the internal temperature Tb in step S103 (FIG. 4), which is the same formula as the formula derived assuming Tt1 (or Tt2)=Tr alone associated with the temperature difference sensor 34. The formula according to the first embodiment assumes that the two temperatures are equal although the temperatures are actually not equal. The formula according to the present embodiment is derived from the heat equivalent circuit for the temperature difference sensor 34 with substantially the same temperatures Ta1 and Ta2.

The internal temperature measurement device 10 according to the present embodiment has the same structure as the internal temperature measurement device 10 according to the first embodiment except that the temperature difference sensors 12a and 12b are replaced with the temperature difference sensor 34. The internal temperature measurement device 10 according to the present embodiment can thus measure (calculate) the internal temperature Tb more accurately than the internal temperature measurement device 10 according to the first embodiment.

Fifth Embodiment

Figure 22:
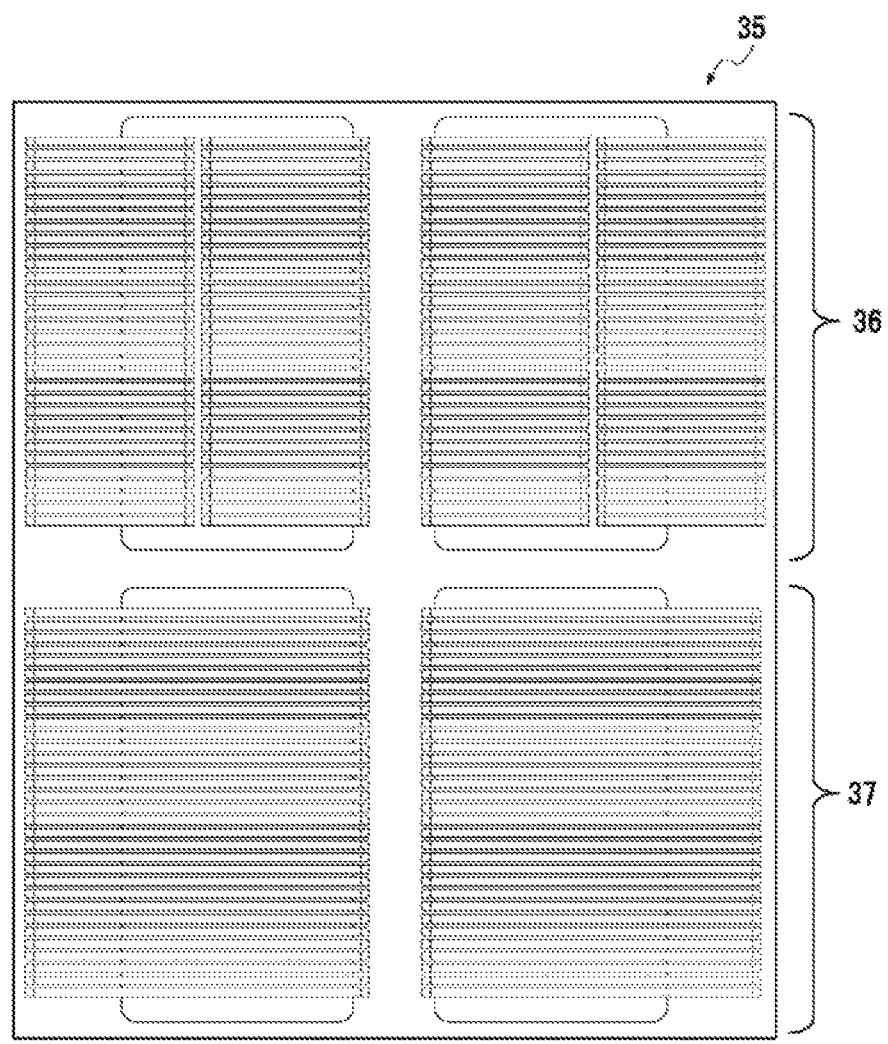
FIG. 22 is a top view of a temperature difference sensor included in an internal temperature measurement device according to a fifth embodiment.

An internal temperature measurement device 10 according to a fifth embodiment of the present invention has the same structure as the internal temperature measurement device 10 according to the third embodiment (FIG. 14) except that the temperature difference sensor 33 is replaced with a temperature difference sensor 35 with the structure shown in FIG. 22.

As shown in FIG. 22, the temperature difference sensor 35 includes a sensor unit 36 and a temperature difference measurement unit 37. The sensor unit 36 included in the temperature difference sensor 35 has the same structure as the temperature difference sensor 34 (FIG. 21) in the internal temperature measurement device 10 according to the fourth embodiment except that the temperature difference measurement unit 37 is connected. The temperature difference measurement unit 37 in the temperature difference sensor 35 includes a thermopile 25, which can measure a temperature difference between the two ends of the left half of the sensor unit 36 and a temperature difference between the two ends of the right half of the sensor unit 36 (the average of the temperature difference between the two ends of the left half of the sensor unit 36 and the temperature difference between the two ends of the right half of the sensor unit 36).

More specifically, the thermopile 25 in the temperature difference sensor 35 can measure a temperature difference $\Delta T3$ in the heat equivalent circuit in FIG. 16 in the same manner as the thermopile 22 in the temperature difference sensor 33.

The internal temperature measurement device 10 according to the present embodiment includes an ASIC 13b and an arithmetic circuit 14b, which are identical to the ASIC 13b and the arithmetic circuit 14b included in the internal temperature measurement device 10 according to the third embodiment (FIG. 14).

More specifically, the sensor unit 36 in the temperature difference sensor 35 can assume that Ta1=Ta2 as in the temperature difference sensor 34 (FIG. 21). However, the value of Ta1 is normally not completely equal to the value of Ta2. When the value of $\Delta T3$ can be measured, the internal temperature Tb can be calculated with the same procedure as used by the internal temperature measurement device 10 according to the third embodiment for calculating the internal temperature Tb.

The internal temperature measurement device 10 according to the present embodiment thus includes the temperature difference sensor 35 with the above structure and the ASIC 13b and the arithmetic circuit 14b identical to the ASIC 13b and the arithmetic circuit 14b included in the internal temperature measurement device 10 of the third embodiment (FIG. 14).

The internal temperature Tb may be measured with higher accuracy either by the internal temperature measurement device 10 of the present embodiment or by the internal temperature measurement device 10 of the fourth embodiment depending on the specific structure of the internal temperature measurement device. The internal temperature measurement device 10 of the present embodiment may measure the internal temperature Tb with higher accuracy, or the internal temperature measurement device 10 according to the fourth embodiment may measure the internal temperature Tb with higher accuracy. The structure of the internal temperature measurement device 10 according to the present embodiment enables any device to constantly measure the internal temperature Tb with higher accuracy than the internal temperature measurement device 10 according to the first embodiment.

Modifications

The internal temperature measurement device 10 according to the above embodiments may be modified variously. For example, the temperature difference sensor 32 in the internal temperature measurement device 10 according to the second embodiment (FIGS. 11 to 13) may include a connection unit 32c having an opening in the thin film. The temperature difference sensor 32 in the internal temperature measurement device 10 according to the second embodiment may include a connection unit 32c as a bulk portion with no thin film. When the connection unit 32c is a bulk portion, more heat is transferred between the sensor unit 32a and the sensor unit 32b through the connection unit 32c. This may lower the measurement accuracy of the internal temperature Tb. The connection unit 32c of the temperature difference sensor 32 may thus include a thin film, or may have an opening in its thin film.

Figure 23:
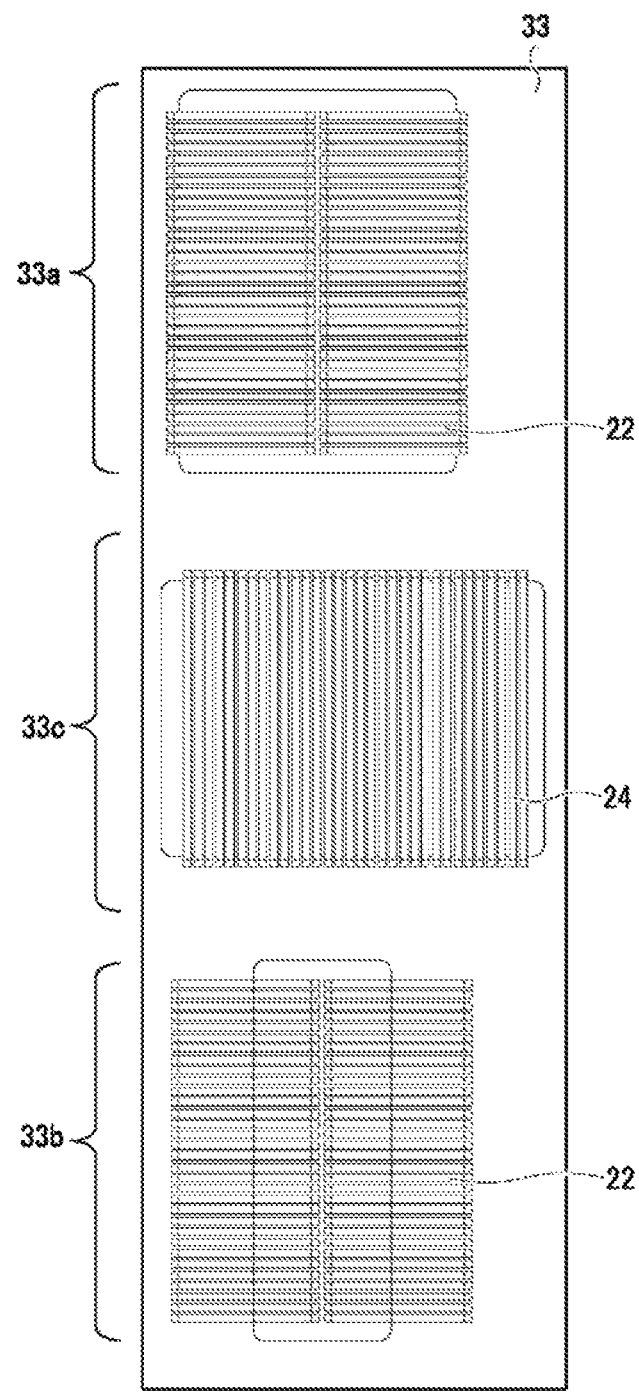
FIG. 23 is a top view of another temperature difference sensor usable in the internal temperature measurement device according to the third embodiment.

The internal temperature measurement device 10 according to the third embodiment may include a sensor with the structure shown in FIG. 23 as the temperature difference sensor 33 (FIG. 18). In other words, the internal temperature measurement device 10 according to the third embodiment may include a temperature difference sensor 33 including a sensor unit 33a, a connection unit 33c, and a sensor unit 33b, which are aligned in a direction perpendicular to the direction in which the temperature difference is measured by the thermopiles 22 in the sensor unit 33a and the sensor unit 33b. The temperature difference sensor 33 includes a thermopile 24 included in the sensor unit 33c, which measures the temperature difference between an end of the sensor unit 33a and an end of the sensor unit 33b.

Figure 24:
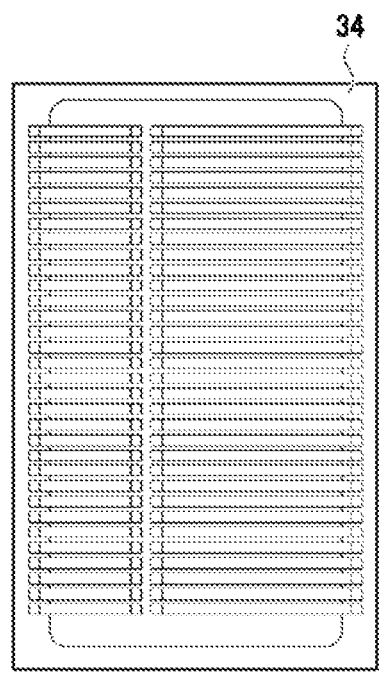
FIG. 24 is a top view of another temperature difference sensor usable in the internal temperature measurement device according to the fourth embodiment.

The internal temperature measurement device 10 according to the fourth embodiment may include a temperature difference sensor 34 with the structure shown in FIG. 24 as the temperature difference sensor 34 (FIG. 19). The temperature difference sensor 34 with this structure in the internal temperature measurement device 10 lowers an output from each thermopile as compared with the temperature difference sensor 34 shown in FIG. 19. The internal temperature measurement device 10 to be used in a noisy environment may thus include the temperature difference sensor 34 shown in FIG. 19.

Further, the arithmetic circuit 14, which calculates the internal temperature Tb using Formula A2 described above, may be a circuit that performs an internal temperature calculation process described below.

The arithmetic circuit 14, which has started the internal temperature calculation process, first performs a monitoring process for storing the value of Tr, the value of dTr/dt, and the value of ΔT1 at a predetermined timing while monitoring the temperature of each part and their temperature differences to determine that the temperatures and the temperature differences are stabilized.

When the temperature of each part is stabilized, the arithmetic circuit 14 completes the monitoring process, and calculates the internal temperature Tb based on the latest measurement result using Formula A2. The arithmetic circuit 14 also calculates the value of Rz/R1 using Formula A8 below.

Formula 8

$$\frac{Rx}{R1} = \frac{k(\Delta T2 - \Delta T1)}{k\Delta T1 - \Delta T2} \quad (A8)$$

Formula A8 is obtained by solving Formulas 1.1 to 1.8 for Rz/R1.

The arithmetic circuit 14 further calculates the value a that satisfies Formula A9 below for calculating Tb in an unsteady state using the calculated value of Rz/R1, the value of Tb, and the value stored in the monitoring process.

Formula 9

$$Tb = Tr + \frac{Rz}{R1} \cdot \Delta T1 + a\left(\frac{dTr}{dt}\right) \quad (A9)$$

Subsequently, the arithmetic circuit 14 repeatedly performs the processing for calculating the internal temperature Tb using Formula A2 and outputting the calculated internal temperature Tb when measuring the values Tr, ΔT1, and ΔT2 and determining that the value of Tr is substantially equal to the previous measurement result, and for calculating the internal temperature Tb and outputting the calculated internal temperature Tb based on the value of Tr, the current measurement result of the value of ΔT1, the calculated value a, and the value of dTr/dt obtained from the current value of Tr and the last value of Tr using Formula A8 when determining that the value of Tr is not substantially equal to the previous measurement result.

The arithmetic circuit 14, which calculates the internal temperature Tb using Formula A2, may be a circuit for performing the internal temperature calculation process described above. In this case, the internal temperature measurement device 10 can accurately measure (calculate) the internal temperature Tb when the internal temperature Tb or the outside air temperature changes after the internal temperature Tb or the outside air temperature reaches its equilibrium state.

The arithmetic circuits 14 and 14b, which calculate the internal temperature Tb using any formula other than Formula A2, each may be a circuit for performing the internal temperature calculation process described above.

The internal temperature measurement device according to each of the above embodiments may be a device used without connecting to a measuring device (e.g., a body thermometer including a liquid crystal display for displaying the internal temperature calculated by an arithmetic circuit). Further, each temperature difference sensor may not have the specific structure described above, and the temperature difference sensor 18 may be arranged separately from the ASIC 13 and may be mounted on a temperature difference sensor (the temperature difference sensor 12 or 32) or on the substrate 11.

REFERENCE SIGNS LIST 10 internal temperature measurement device
11 substrate
12, 32, 33, 34, 35 temperature difference sensor
13 ASIC
14 arithmetic circuit
15 terminal
16 housing
18 temperature sensor
21 thin film
22, 24 thermopile
25 support

The invention claimed is:
1. An internal temperature measurement method for measuring an internal temperature of an object, the method comprising:
measuring a first temperature difference across a first thin film comprising a first heat entry part and a first heat discharge part on a first heat transfer path using a first thermopile, the first heat transfer path extending from a portion of a surface of the object to the first heat discharge part, and measuring a second temperature difference across a second thin film comprising a second heat entry part and a second heat discharge part on a second heat transfer path using a second thermopile, the second heat transfer path extending from another portion of the surface of the object to the second heat discharge part and having a thermal resistance different from a thermal resistance of the first heat transfer path, and measuring a reference temperature using a temperature sensor, the reference temperature being a temperature at a predetermined position on the first heat transfer path or the second heat transfer path; and calculating the internal temperature of the object using the first temperature difference, the second temperature difference, and the measured reference temperature and at least one predetermined value excluding a physical property value of a non-heating part of the object located at a surface side of the object.

2. The internal temperature measurement method according to claim 1, wherein calculating the internal temperature of the object includes calculating the internal temperature of the object using a formula for calculating the internal temperature of the object derived assuming that a temperature of the first heat discharge part is equal to a temperature of the second heat discharge part.

3. The internal temperature measurement method according to claim 1, wherein measuring the first temperature difference and the second temperature difference further includes measuring a third temperature difference between the first heat entry part and the second heat entry part using a third thermopile, and calculating the internal temperature of the object includes calculating the internal temperature of the object using the first temperature difference, the second temperature difference, the third temperature difference, and the measured reference temperature, and the at least one predetermined value.

4. The internal temperature measurement method according to claim 1, wherein measuring the first temperature difference and the second temperature difference includes measuring the first temperature difference and the second temperature difference that are associated with the first heat transfer path and the second heat transfer path in which the first heat discharge part and the second heat discharge part are identical or connected to each other.

5. The internal temperature measurement method according to claim 1, wherein the at least one predetermined value includes a ratio of a thermal resistance of a portion of the first heat transfer path from the first heat entry part to the first heat discharge part to a thermal resistance of a portion of the second heat transfer path from the second heat entry part to the second heat discharge part or an inverse of the ratio.

6. The internal temperature measurement method according to claim 1, further comprising:

calculating a parameter associated with a thermal resistance of the non-heating part to be included in a formula for calculating the internal temperature of the object in a nonequilibrium state based on a measurement result obtained in measuring at least the first temperature difference across the first thin film comprising the first heat entry part and the first heat discharge part on the first heat transfer path using the first thermopile, and measuring the second temperature difference across the second thin film comprising the second heat entry part and the second heat discharge part on the second heat transfer path using the second thermopile; and calculating the internal temperature of the object in the nonequilibrium state based on the formula for calculating the temperature using the calculated parameter.

7. An internal temperature measurement device, comprising:

a substrate having a first surface to be placed in contact with a surface of an object to measure an internal temperature of the object;

a first temperature difference sensor and a second temperature difference sensor arranged on a second surface of the substrate;

a temperature sensor; and a calculation unit configured to calculate the internal temperature of the object using a temperature difference measured by the first temperature difference sensor, a temperature difference measured by the second temperature difference sensor, a temperature measured by the temperature sensor, and at least one predetermined value excluding a physical property value of a non-heating part of the object located at a surface side of the object, wherein the first temperature difference sensor includes
a first thin film including a first heat entry part and a first heat discharge part; and
a first thermopile configured to detect a temperature difference between the first heat entry part and the first heat discharge part included in the first thin film, and the first thin film is supported on the substrate with a first thermal conductivity member configured to transfer heat entering the substrate from the object to the first heat entry part included in the first thin film, the second temperature difference sensor includes
a second thin film including a second heat entry part and a second heat discharge part; and
a second thermopile configured to detect a temperature difference between the second heat entry part and the second heat discharge part included in the second thin film, and the second thin film is supported on the substrate with a second thermal conductivity member configured to transfer heat entering the substrate from the object to the second heat entry part included in the second thin film, and a thermal resistance of a portion of a heat transfer path extending from a heat entrance of the second thermal conductivity member to the second heat discharge part in the second thin film is different from a thermal resistance of a portion of a heat transfer path extending from a heat entrance of the first thermal conductivity member of the first temperature difference sensor to the first heat discharge part included in the first thin film, and the temperature sensor is configured to measure a temperature of the second surface of the substrate, a temperature of the first heat entry part of the first temperature difference sensor, or a temperature of the second heat entry part of the second temperature difference sensor.

8. The internal temperature measurement device according to claim 7, wherein
the calculation unit is configured to calculate the internal temperature of the object using a formula for calculating the internal temperature of the object derived assuming that a temperature of the first heat discharge part is equal to a temperature of the second heat discharge part.

9. The internal temperature measurement device according to claim 7, further comprising
a connection unit configured to connect the first heat entry part of the first temperature difference sensor and the second heat entry part of the second temperature difference sensor.

10. The internal temperature measurement device according to claim 7, further comprising
a third thin film configured to connect the first heat entry part of the first temperature difference sensor and the second heat entry part of the second temperature difference sensor, the third thin film including a third thermopile configured to measure a temperature difference between the first heat entry part of the first temperature difference sensor and the second heat entry part of the second temperature difference sensor,
wherein the calculation unit is configured to calculate the internal temperature of the object using a temperature difference measured by the first temperature difference sensor, a temperature difference measured by the second temperature difference sensor, a temperature difference measured by the third thermopile, and a temperature measured by the temperature sensor, and the at least one predetermined value.

11. The internal temperature measurement device according to claim 7, wherein
the first heat discharge part of the first temperature difference sensor and the second heat discharge part of the second temperature difference sensor are identical or connected to each other.

12. The internal temperature measurement device according to claim 7, wherein
the at least one predetermined value includes a ratio of a thermal resistance of a portion of the first heat transfer path from the first heat entry part to the first heat discharge part to a thermal resistance of a portion of the second heat transfer path from the second heat entry part to the second heat discharge part or an inverse of the ratio.

13. The internal temperature measurement device according to claim 7, wherein
the calculation unit is further configured to calculate a parameter associated with a thermal resistance of the non-heating part to be included in a formula for calculating the internal temperature of the object in a nonequilibrium state based on a measurement result obtained by each sensor, and to calculate the internal temperature of the object in the nonequilibrium state based on the formula for calculating the temperature using the calculated parameter.

* * * * *